(12) United States Patent
Smith et al.

(10) Patent No.: US 12,534,392 B2
(45) Date of Patent: Jan. 27, 2026

(54) TANK CONFIGURATION WITH ENHANCED DENITRIFICATION

(71) Applicant: KleanTu LLC, Bridgeville, PA (US)

(72) Inventors: John R. Smith, Pittsburgh, PA (US); Andrew C. Middleton, Mount Sidney, VA (US); Robin L. Weightman, Murrysville, PA (US); Robert Horger, Harrison City, PA (US); Richard Donahue, Edgartown, MA (US); Jaw Fu, Murrysville, PA (US)

(73) Assignee: KleanTu LLC, Bridgeville, PA (US)

( * ) Notice: Subject to any disclaimer, the term of this patent is extended or adjusted under 35 U.S.C. 154(b) by 244 days.

(21) Appl. No.: 17/880,946

(22) Filed: Aug. 4, 2022

(65) Prior Publication Data

US 2024/0018026 A1 Jan. 18, 2024

Related U.S. Application Data

(60) Provisional application No. 63/230,007, filed on Aug. 5, 2021.

(51) Int. Cl.
*C02F 3/30* (2023.01)
*C02F 3/10* (2023.01)
(Continued)

(52) U.S. Cl.
CPC ............. *C02F 3/305* (2013.01); *C02F 3/105* (2013.01); *C02F 3/223* (2013.01); *C02F 3/307* (2013.01);
(Continued)

(58) Field of Classification Search
CPC .......... C02F 3/305; C02F 3/105; C02F 3/223; C02F 3/307; C02F 3/1242; C02F 3/288;
(Continued)

(56) References Cited

U.S. PATENT DOCUMENTS

| 5,207,899 A | 5/1993 | Boyle |
| 5,330,651 A | 7/1994 | Robertson et al. |

(Continued)

FOREIGN PATENT DOCUMENTS

| CN | 1139078 A | * | 1/1997 | ............ C02F 3/1242 |
| CN | 205011470 U | * | 2/2016 | |

(Continued)

OTHER PUBLICATIONS

Machine-generated English translation of DE 202014102500, generated on Nov. 6, 2024.*

(Continued)

*Primary Examiner* — Fred Prince
(74) *Attorney, Agent, or Firm* — Christopher B. Kilner; MILLEN, WHITE, ZELANO & BRANIGAN

(57) ABSTRACT

An enhanced multiple compartmented (segmented or chambered) supplemental tank system that (i) adds another media to enhance wood chip denitrification, and (ii) includes a component for recycling treated wastewater back to the front end of the system with mainly nitrate-N recycled back and combined with organic carbon (present in wastewater) under anoxic to form nitrogen gas and $CO_2$. The latter uses an aeration pump and tubing to reduce soluble organics and assist with the conversion of ammonia-N to nitrite-N and nitrate-N.

22 Claims, 19 Drawing Sheets

(51) Int. Cl.
*C02F 3/12* (2023.01)
*C02F 3/22* (2023.01)
*C02F 3/28* (2023.01)
*C02F 103/16* (2006.01)

(52) U.S. Cl.
CPC ............ *C02F 3/1242* (2013.01); *C02F 3/288* (2013.01); *C02F 2103/16* (2013.01); *C02F 2301/046* (2013.01); *C02F 2305/06* (2013.01)

(58) Field of Classification Search
CPC ............ C02F 2103/16; C02F 2301/046; C02F 2305/06
USPC .... 210/195.1, 615, 616, 617, 620, 621, 630, 210/903, 150, 151, 259
See application file for complete search history.

(56) References Cited

U.S. PATENT DOCUMENTS

| | | | | |
|---|---|---|---|---|
| 5,454,949 | A | * | 10/1995 | Davis ........................ C02F 3/06 210/138 |
| 5,770,059 | A | * | 6/1998 | Rhee .................. B01D 21/0018 210/538 |
| 5,980,739 | A | | 11/1999 | Jowett |
| 6,444,126 | B1 | * | 9/2002 | Gates ....................... C02F 3/006 210/150 |
| 7,550,082 | B2 | * | 6/2009 | Sumino .................... C02F 3/302 210/903 |
| 2004/0206699 | A1 | * | 10/2004 | Ho ........................... C02F 3/302 210/150 |
| 2006/0163156 | A1 | * | 7/2006 | Eto .......................... C02F 3/301 210/220 |
| 2006/0180546 | A1 | * | 8/2006 | Stuth, Sr. .................. C02F 3/22 210/151 |
| 2006/0196827 | A1 | * | 9/2006 | Liao .................... B01D 21/0018 210/521 |
| 2006/0231489 | A1 | * | 10/2006 | Kim ...................... B01D 21/283 210/620 |
| 2007/0267346 | A1 | * | 11/2007 | Sengupta .................. C02F 3/10 210/151 |
| 2008/0185335 | A1 | | 8/2008 | Holt |
| 2009/0283472 | A1 | * | 11/2009 | Gerardi .................... C02F 3/101 210/615 |
| 2011/0079555 | A1 | | 4/2011 | Wu |
| 2012/0211114 | A1 | | 8/2012 | Nilsson et al. |
| 2014/0076800 | A1 | | 3/2014 | Graves |
| 2014/0263006 | A1 | * | 9/2014 | Potts ........................ C02F 3/306 210/197 |
| 2018/0155225 | A1 | * | 6/2018 | Smith ...................... C02F 3/302 |
| 2020/0024171 | A1 | * | 1/2020 | Smith ...................... C02F 3/307 |
| 2021/0380449 | A1 | * | 12/2021 | Hsu ........................... C02F 3/20 |
| 2023/0416124 | A1 | | 12/2023 | Smith et al. |

FOREIGN PATENT DOCUMENTS

| | | | | |
|---|---|---|---|---|
| CN | 110615580 | A | * | 12/2019 |
| CN | 111305345 | A | * | 6/2020 ................ C02F 3/32 |
| DE | 3928255 | C2 | * | 3/1992 |
| DE | 202014102520 | U1 | * | 9/2014 ............ C02F 3/1242 |
| EP | 1693446 | A1 | * | 8/2006 .............. C02F 3/302 |
| JP | H05-317872 | A | * | 12/1993 |
| JP | 2016159290 | A | * | 9/2016 ............. B01D 24/02 |
| KR | 20170138622 | A | * | 12/2017 |

OTHER PUBLICATIONS

Machine-generated English translation of DE 3928255, generated on Nov. 6, 2024.*
Machine-generated English translation of CN 110615580, generated on Nov. 6, 2024.*
Machine-generated English translation of EP 1693446, generated on Nov. 6, 2024.*
Machine-generated English translation of CN 205011470, generated on Nov. 6, 2024.*
Machine-generated English translation of JP 2016-159290, generated on Nov. 6, 2024.*
Machine-generated English translation of KR 2017-0138622, generated on Nov. 6, 2024.*
Machine-generated English translation of JP H05-317872, generated on Mar. 12, 2025.*
Machine-generated English translation of CN 111305345, generated on Jun. 20, 2025.*
Machine-generated English translation of CN 1139078, generated on Jun. 20, 2025.*
Louis A. Schipper et al., Denitrifying bioreactors—An Approach for reducing nitrate loads to receiving waters, Ecological Engineering, (Apr. 2010).
W.D. Robertson et al., Long-Term Performance of In Situ Reactive Barriers for Nitrate Remediation, Ground Water Sep. Oct. 2000.

* cited by examiner

FIG. 21

TANK CONFIGURATION WITH ENHANCED DENITRIFICATION

CROSS-REFERENCE TO RELATED APPLICATIONS

This application is a perfection of U.S. Application Ser. No. 63/230,007, filed on Aug. 5, 2021, the disclosure of which is fully incorporated by reference herein.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

(1) Field of the Invention

This invention relates to the field of enhanced domestic wastewater treatment following in-ground or above-ground septic or settling tanks. More particularly, it relates to a series of improvements in septic tank systems for a single household, developments with multiple households combined, small commercial businesses, or small municipalities.

This invention focuses on a supplemental concrete tank (underground or on surface) with a primary focus on enhancing the biological conversion of organic and ammonia nitrogen ultimately to nitrogen gas is accomplished by first converting ammonia to both nitrite-N and nitrate-N under aerobic conditions, then converting the nitrite-N and nitrate-N to nitrogen gas beyond that achieved by using wood chips alone under anoxic conditions. Because of this tank's sequential configurations and operation, it also facilitates the anammox process (i.e., the conversion of ammonia plus nitrite-N to nitrogen gas). Additionally, the use of organic carbon present in the wastewater can also be used to supplement the conversion to Nitrogen gas via the anoxic conversion of Nitrate with organic carbon via a recycling loop using the same air pressure used for aeration in an innovative manner.

(2) Description of Related Art Including Information Disclosed Under 37 CFR 1.97 and 1.98

None.

BRIEF SUMMARY OF THE INVENTION

The focus of this application is to provide an enhanced septic tank system, especially one having a multiple compartmented (segmented or chambered) supplemental tank with a plurality of strategically situated access holes (both small and large ports) in a purposefully staggered arrangement. The invention can be practiced on one tank or on a plurality of tanks to achieve the same results but for high wastewater flowrates.

Particularly, this invention: (i) adds different media to enhance the wood chip denitrification process. Furthermore, it: (ii) adds a recycle component for recycling treated wastewater back to the front end of the process using the same aeration pump and tubing that is being used for the aeration of the wastewater previously used to reduce soluble organics and the conversion of ammonia-N to nitrite-N and nitrate-N and ultimately Nitrogen gas This invention further includes a winter mix variation that entails adding an oil-based emulsion to enhance denitrification, seasonally, as a "booster" when colder temperatures warrant the addition, i.e., because the wood chips alone do not release a sufficient amount of organics during winter operation. Preferably, the booster would be inserted into the nitro tank influent chamber, ahead of the wood chips as explained in more detail below.

BRIEF DESCRIPTION SEVERAL VIEWS OF THE PHOTOGRAPHS AND DRAWING(S)

Further features, objectives and advantages of these inventions will be more apparent when reviewing the following Detailed Description made with reference to the accompanying drawings in which:

FIG. 1 is a photograph, top front perspective view showing the various NitROE® Tank Components, from Trough A to Trough C;

FIG. 2 is a photograph, reverse view from FIG. 1, showing the various NitROE® Tank Components, from Trough C to Trough A;

FIG. 3 is a photograph, right side view showing some of the various NitROE® Tank Components;

FIG. 4 is a photograph, right side, closeup view of the various NitROE® Tank Components, especially between Troughs A and B, particularly the submerged aeration chamber (or SAC);

FIG. 5 is a photograph, right side, closeup view of the various NitROE® Tank Components, especially from the SAC Chamber to the Denitrification Chamber (or DC) A; and FIG. 6 is a photograph, right side, closeup view of the various NitROE® Tank Components, from Denitrification Chamber A to Denitrification Chamber B, then to the end of the tank at Trough C.

Air Lift Recycle Line Concept

Figure 1:
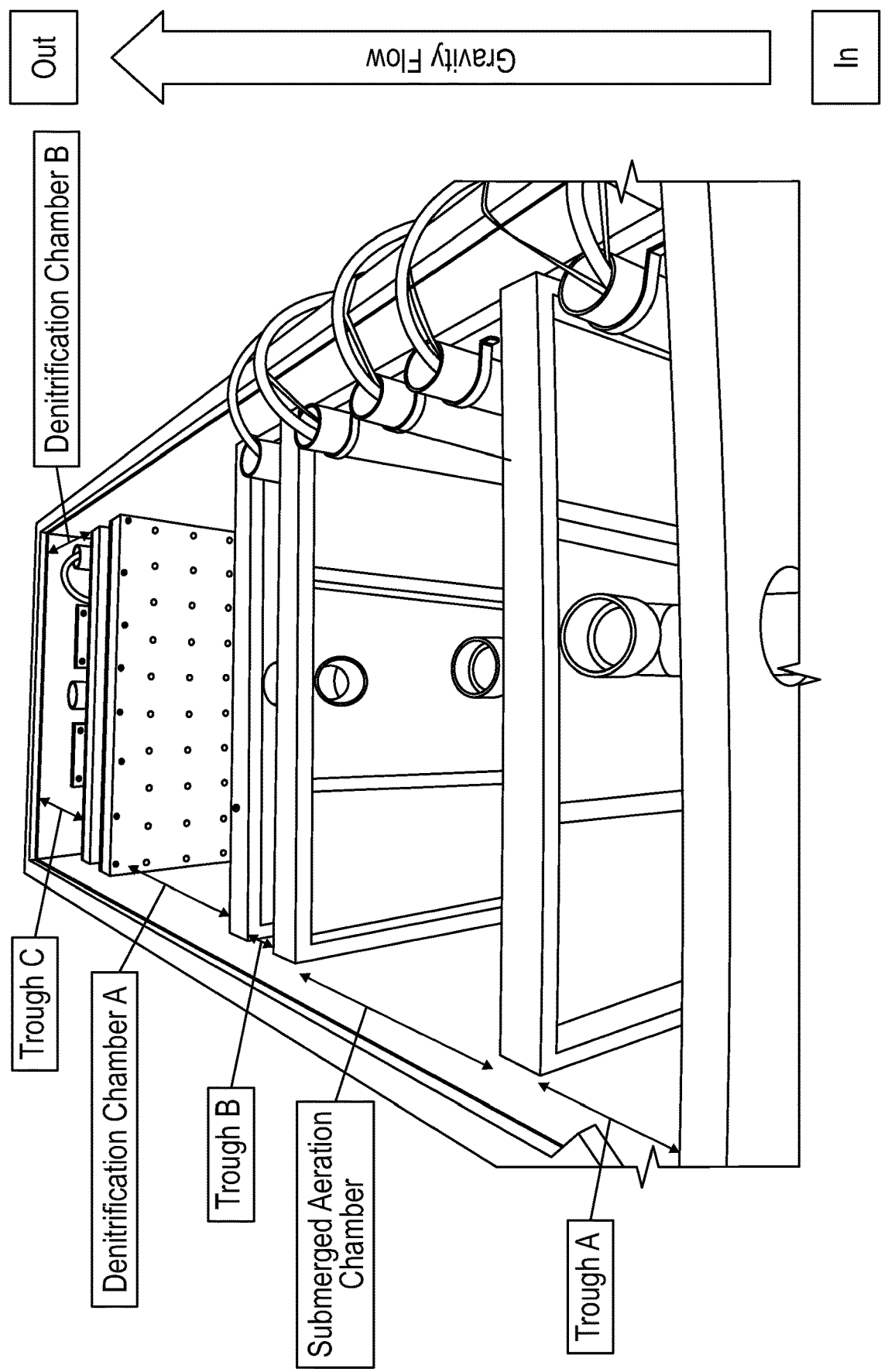
FIGS. 1-6 are photos showing the NitROE tank or tanks with different troughs and chambers, said NitROE tank or tanks following an upfront septic tank or tanks. More specifically.
Figure 2:
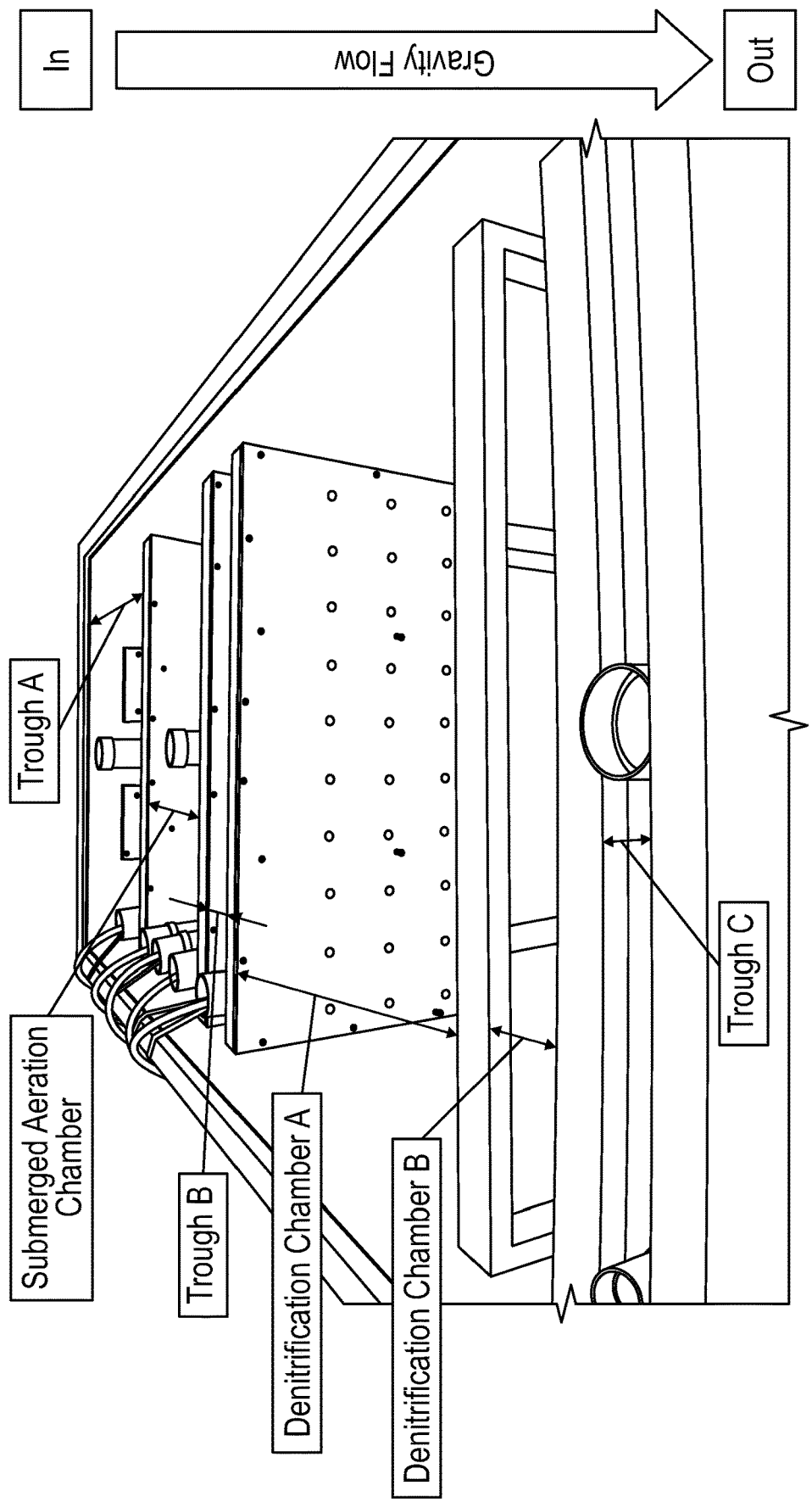
Figure 3:
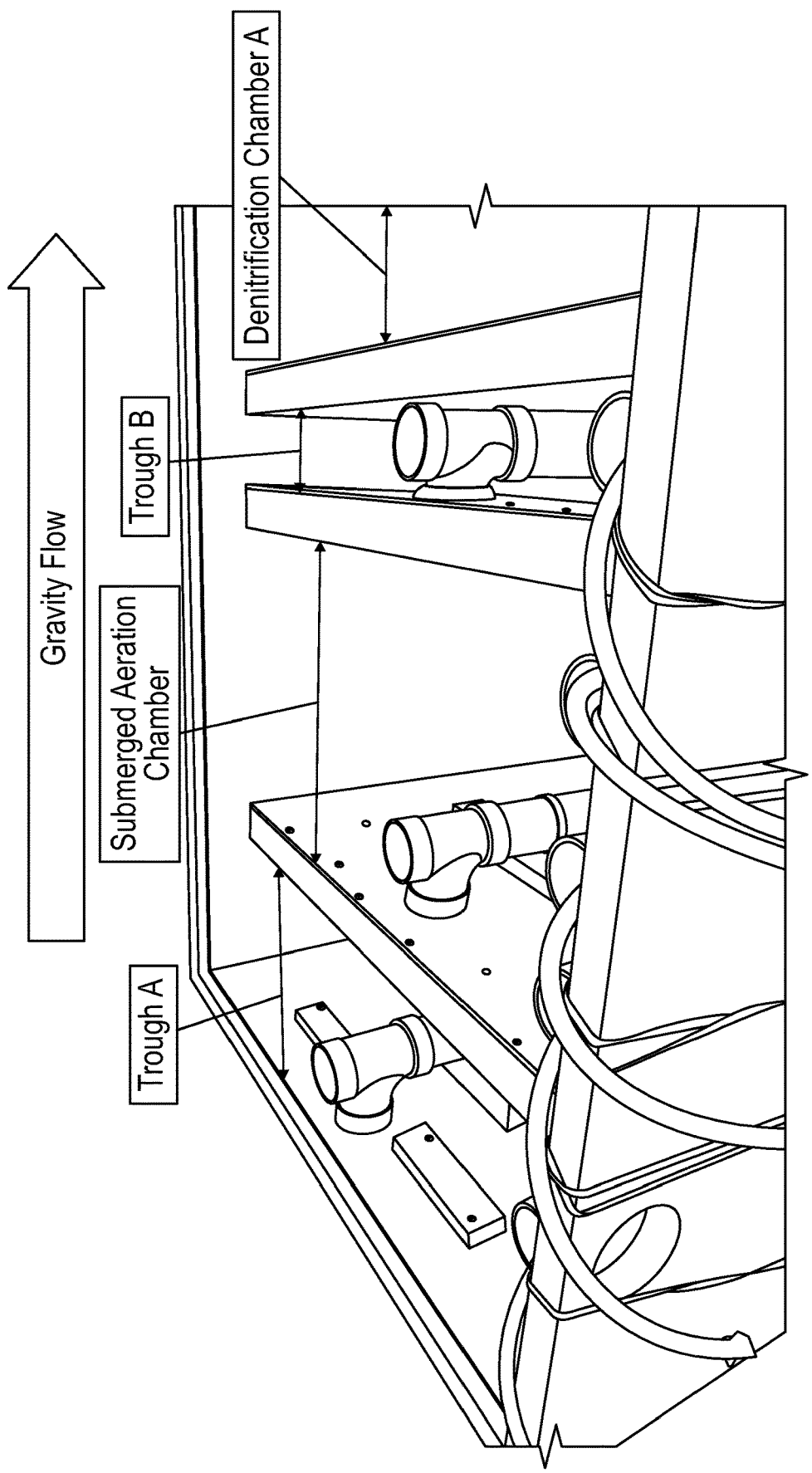
Figure 4:
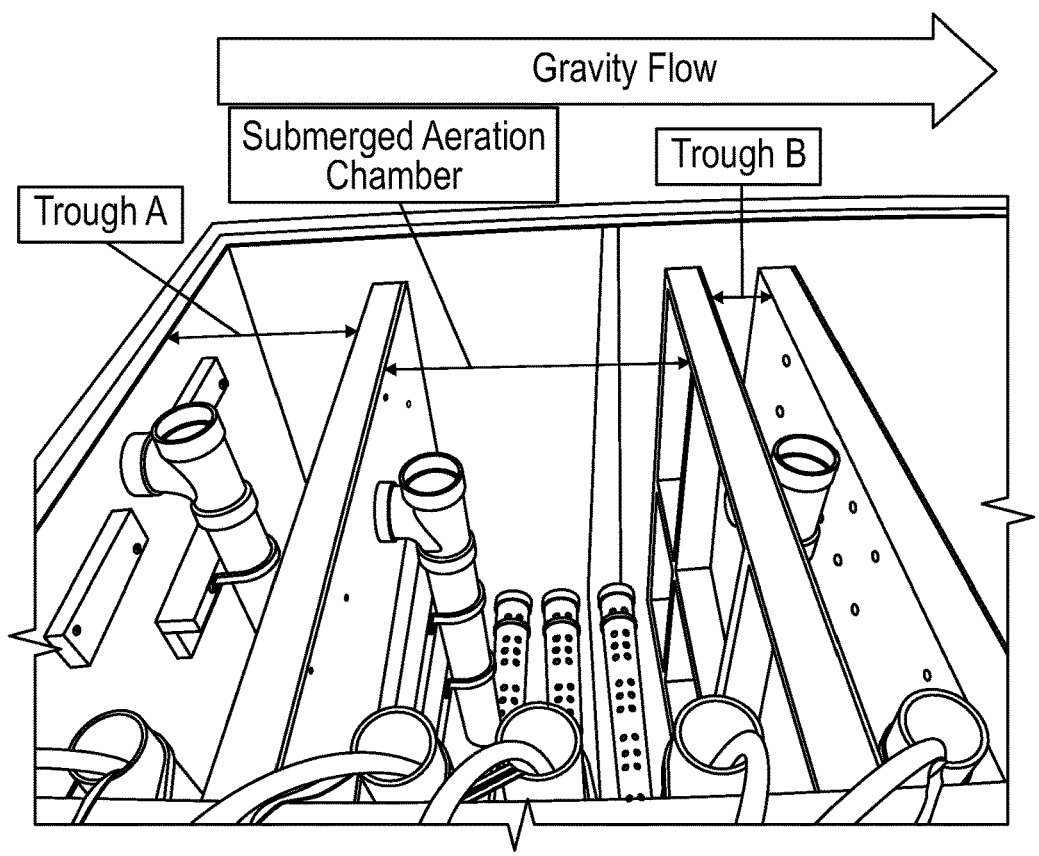
Figure 5:
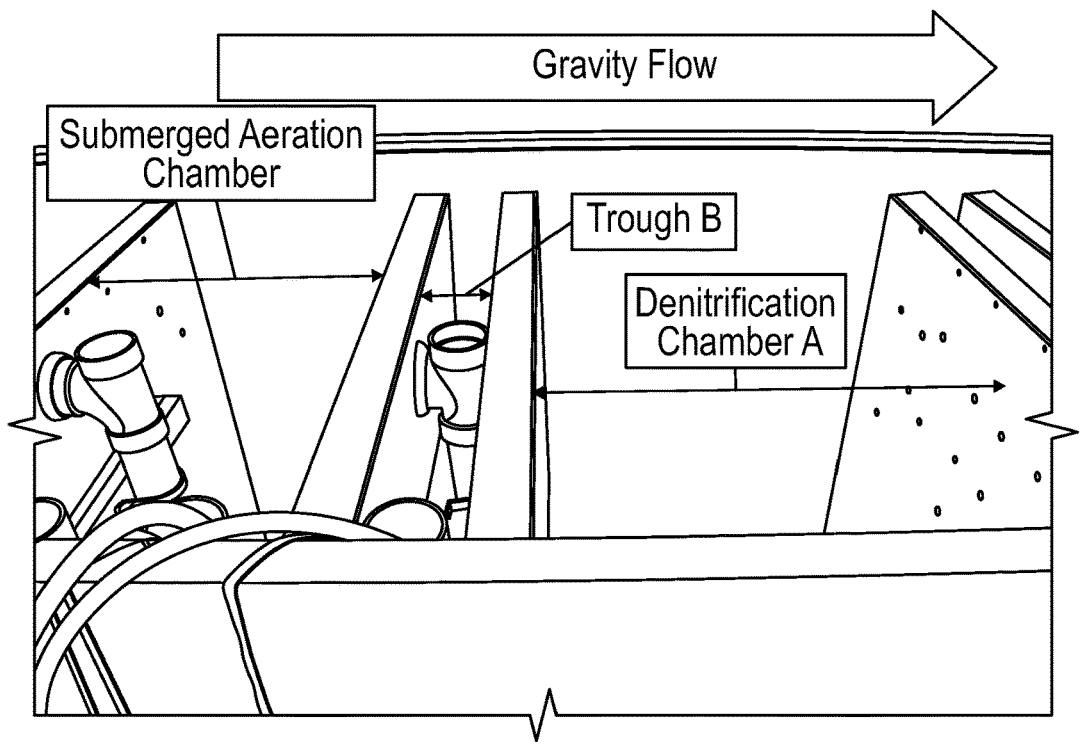
Figure 6:
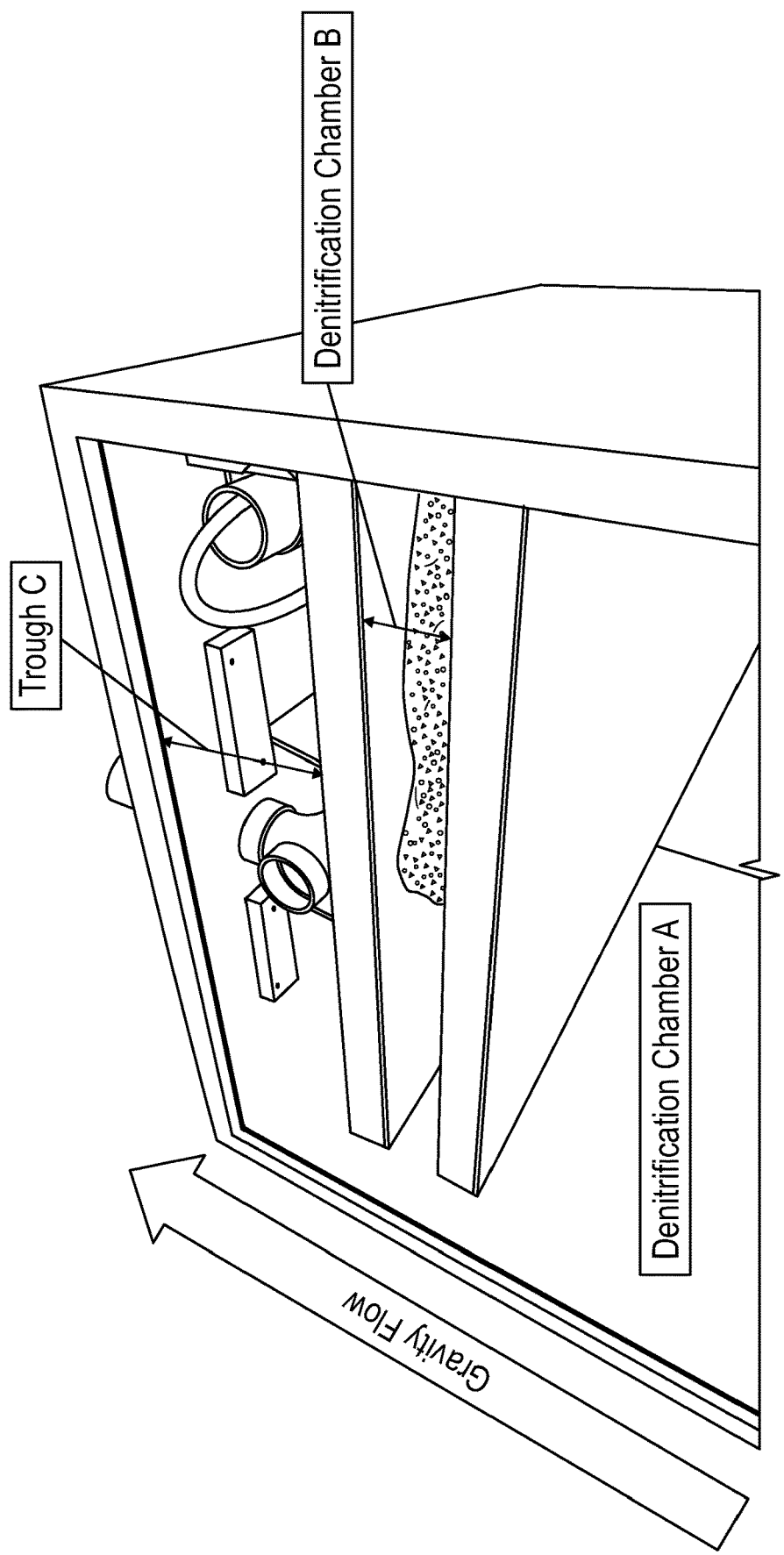
Figure 7:
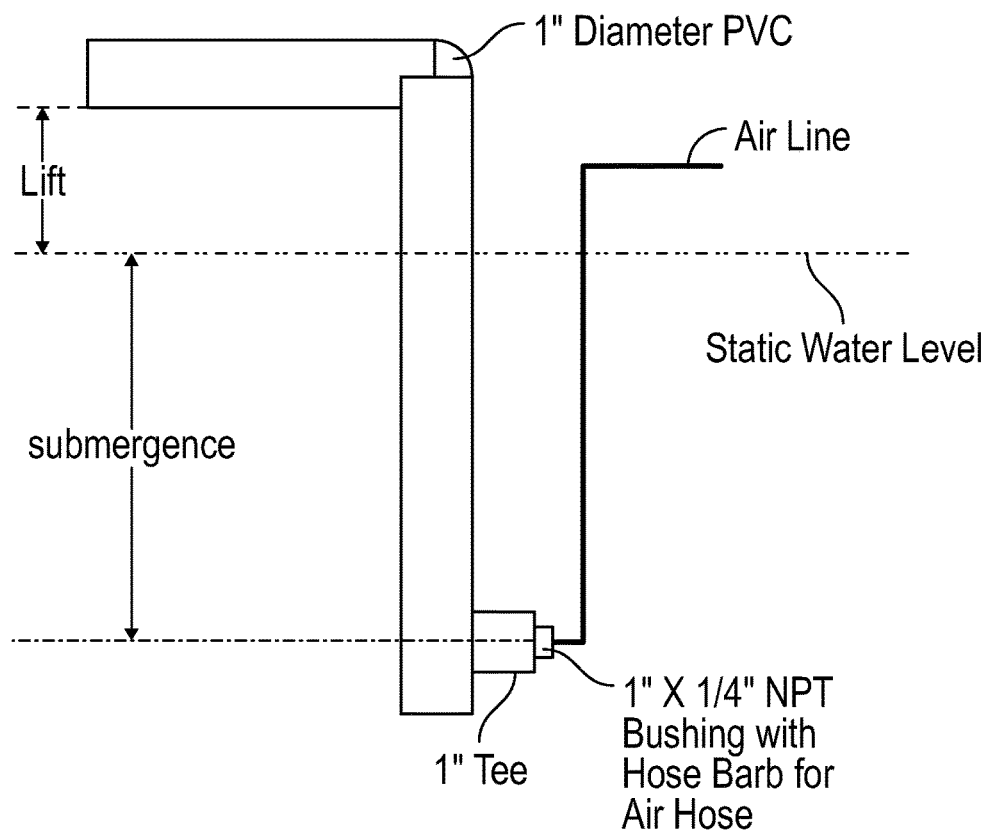
Figure 8:
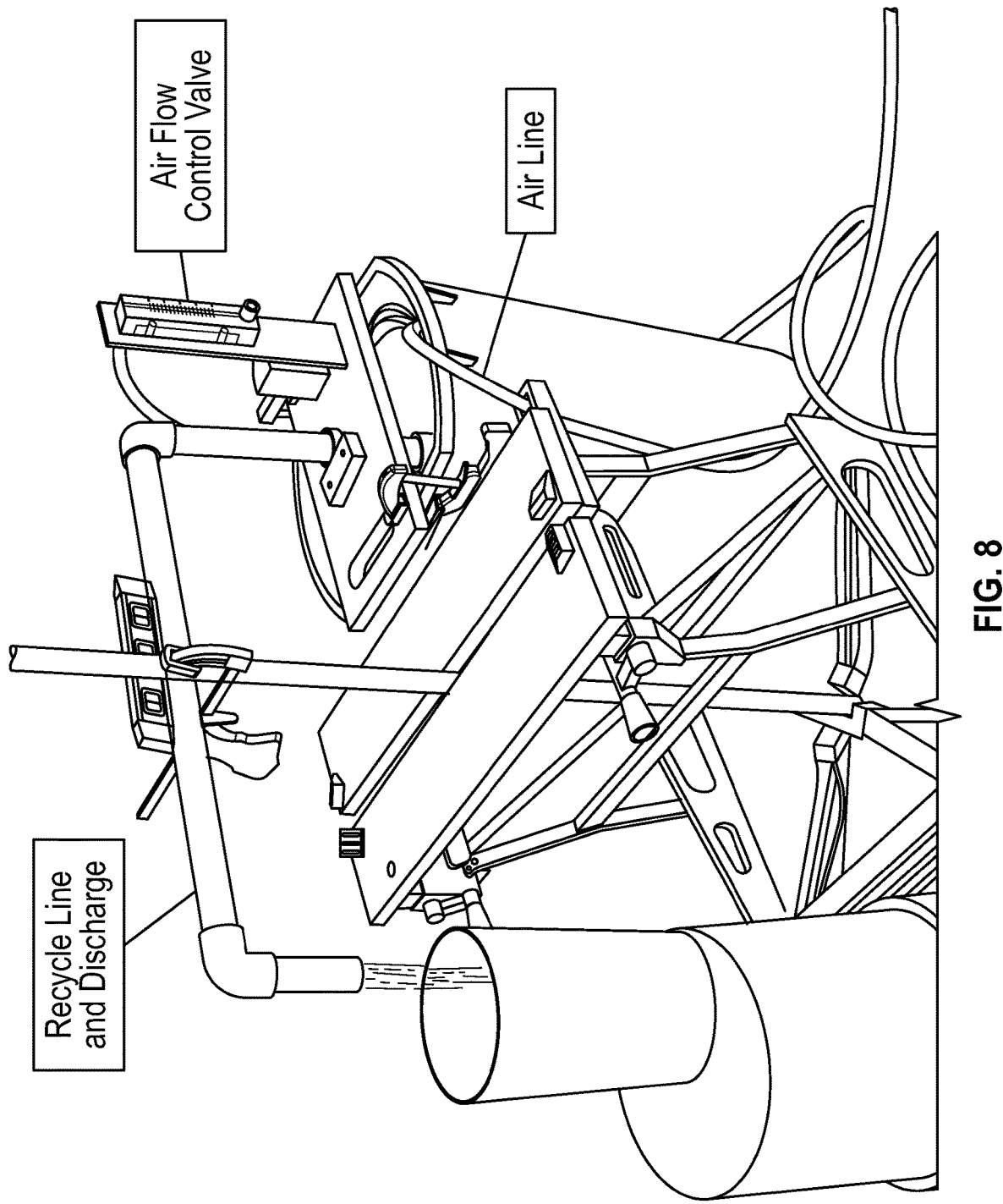
Figure 9:
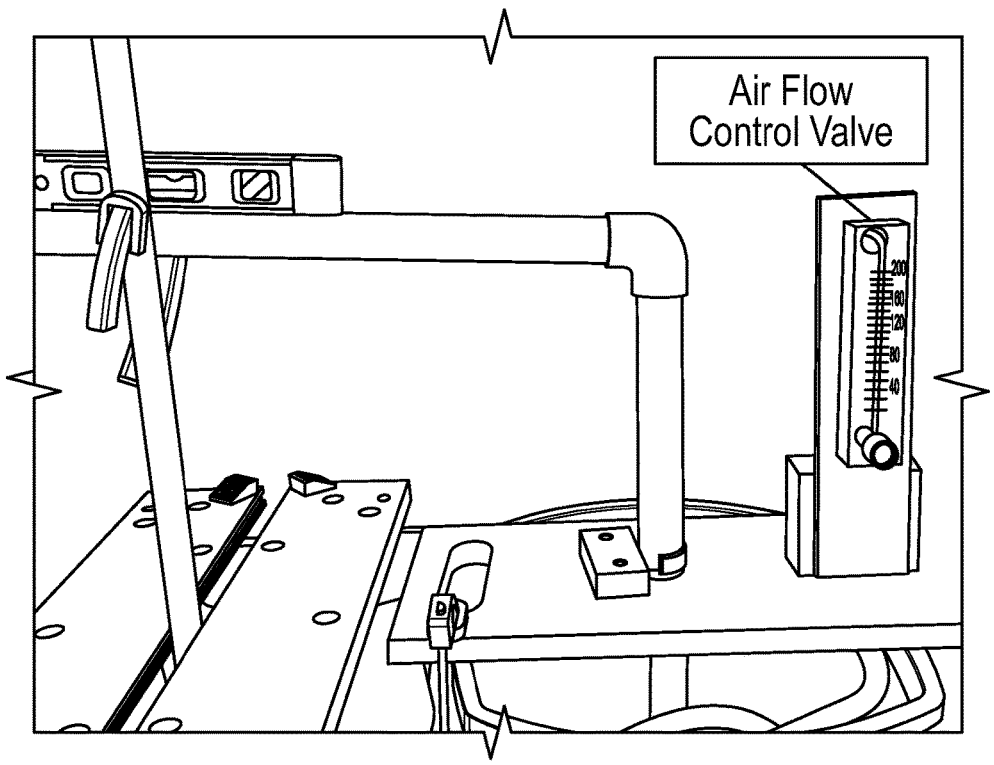
Figure 10:
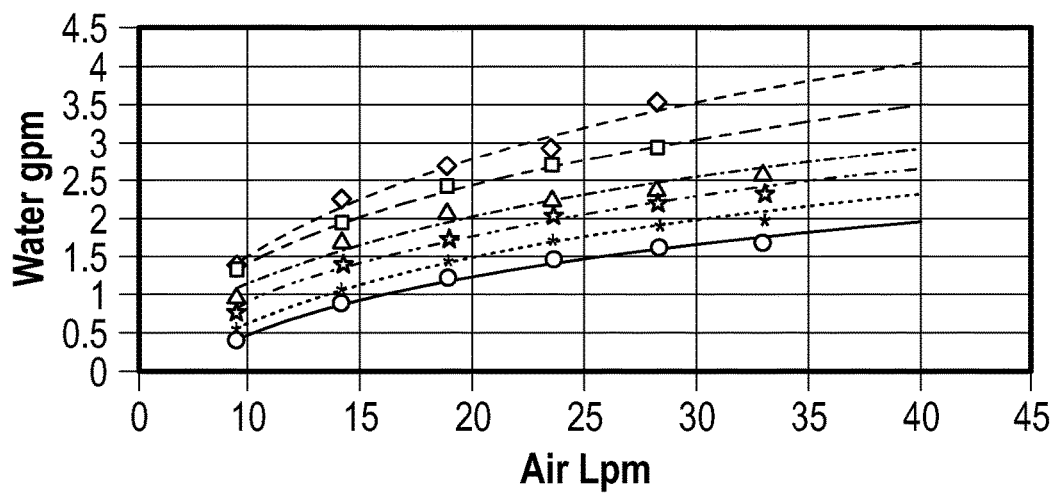
Figure 11:
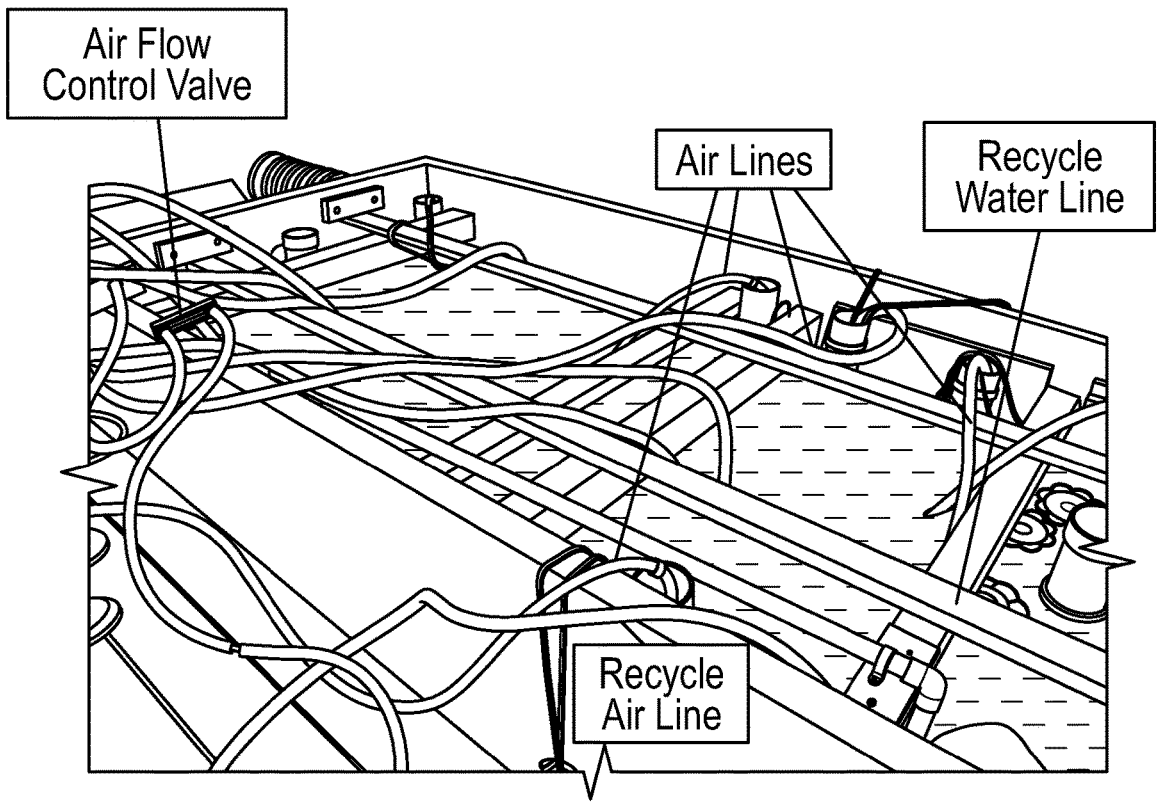
Figure 12:
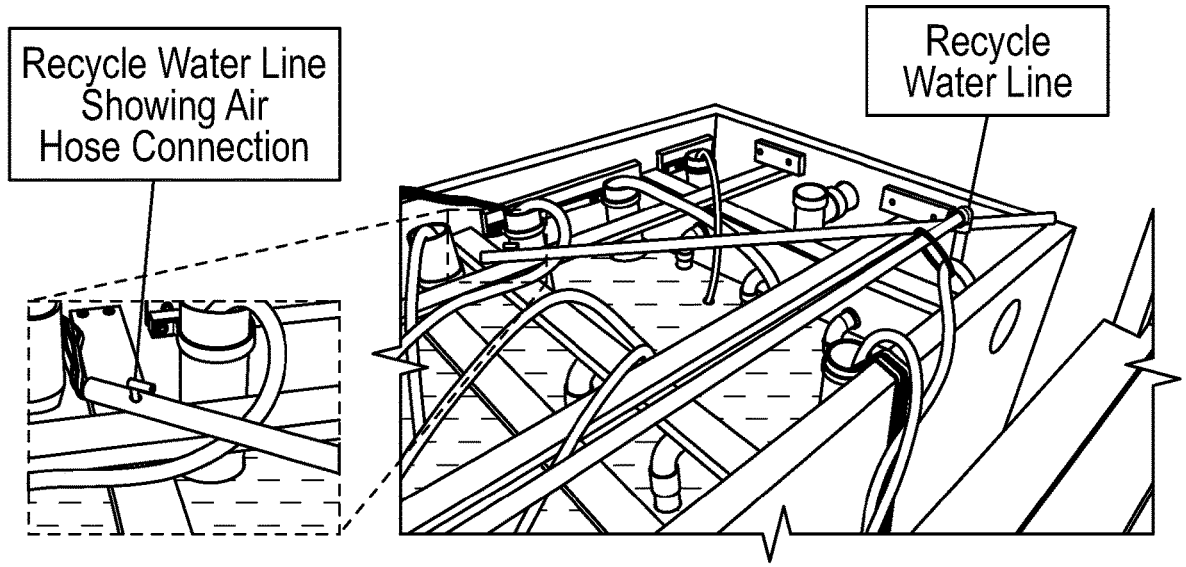
Figure 13:
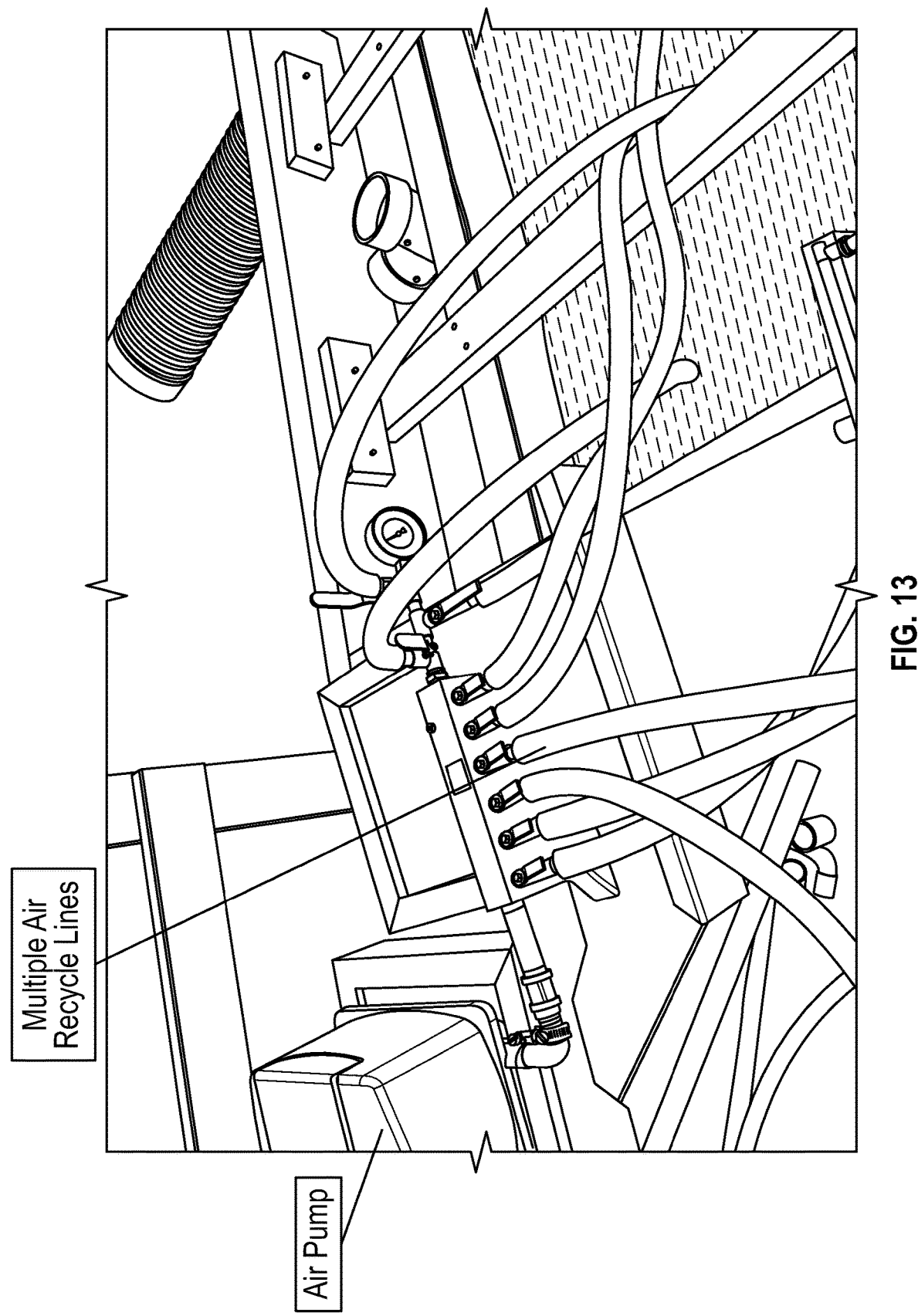
Figure 14:
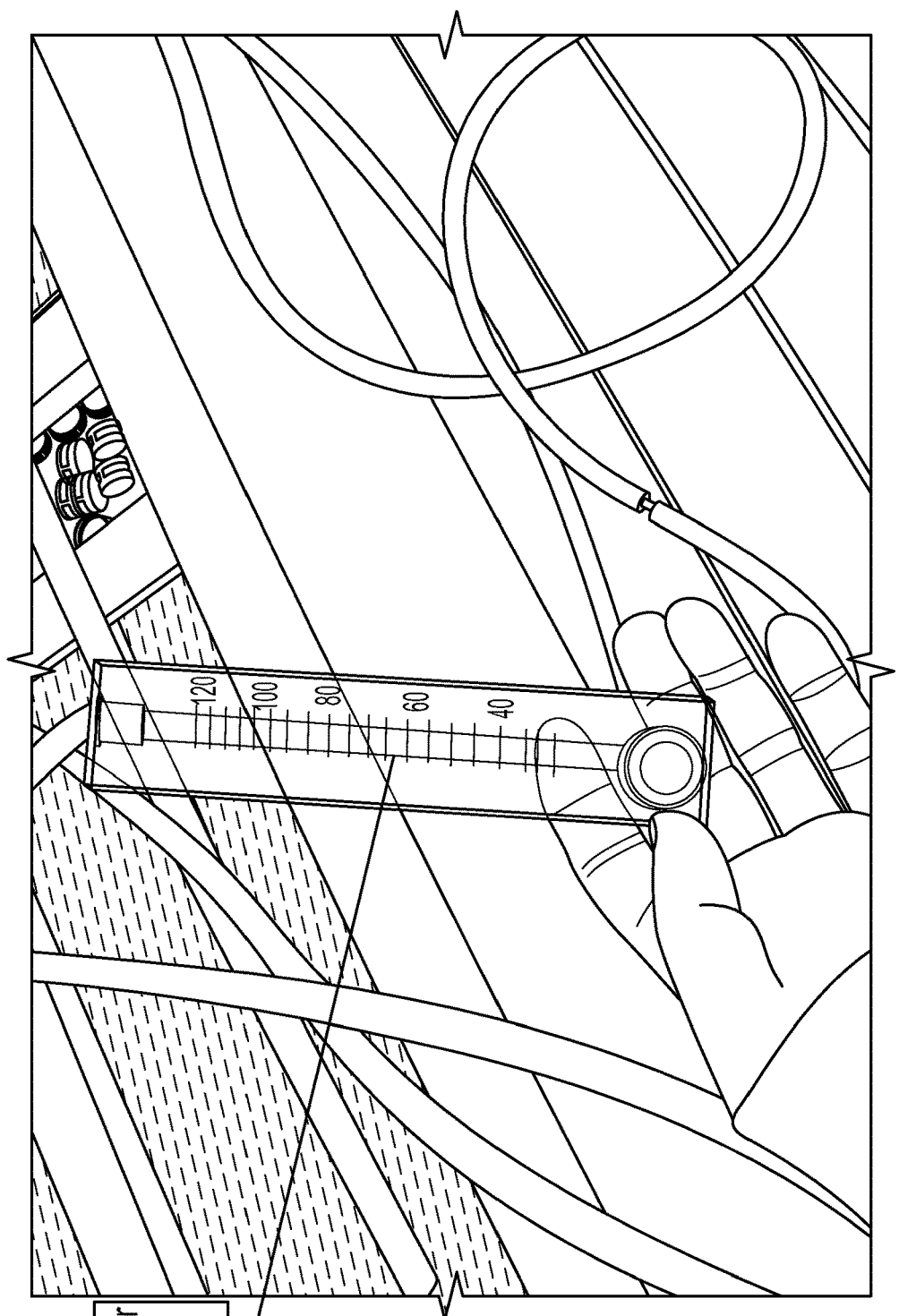
Figure 15:
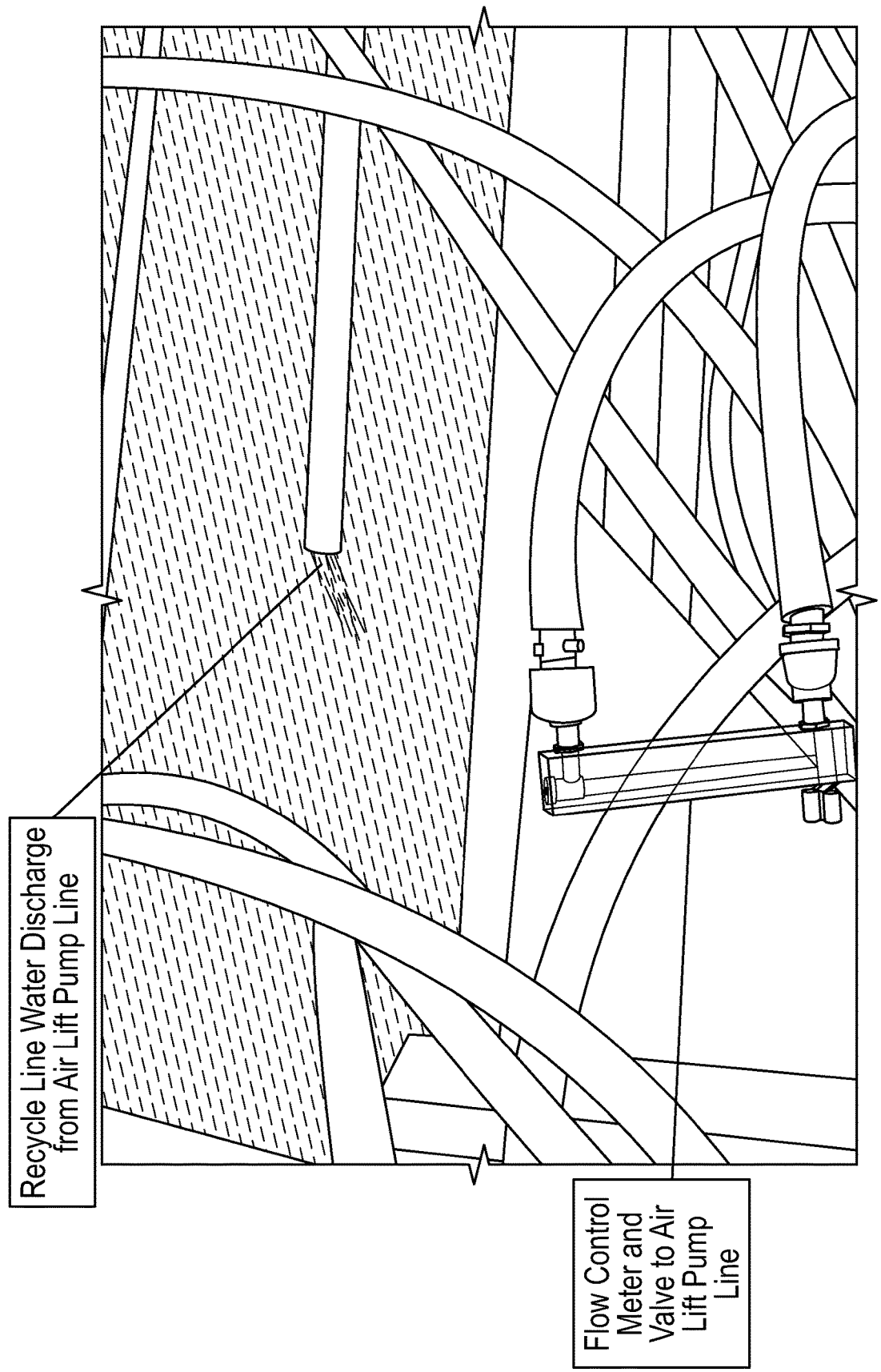
Figure 16:
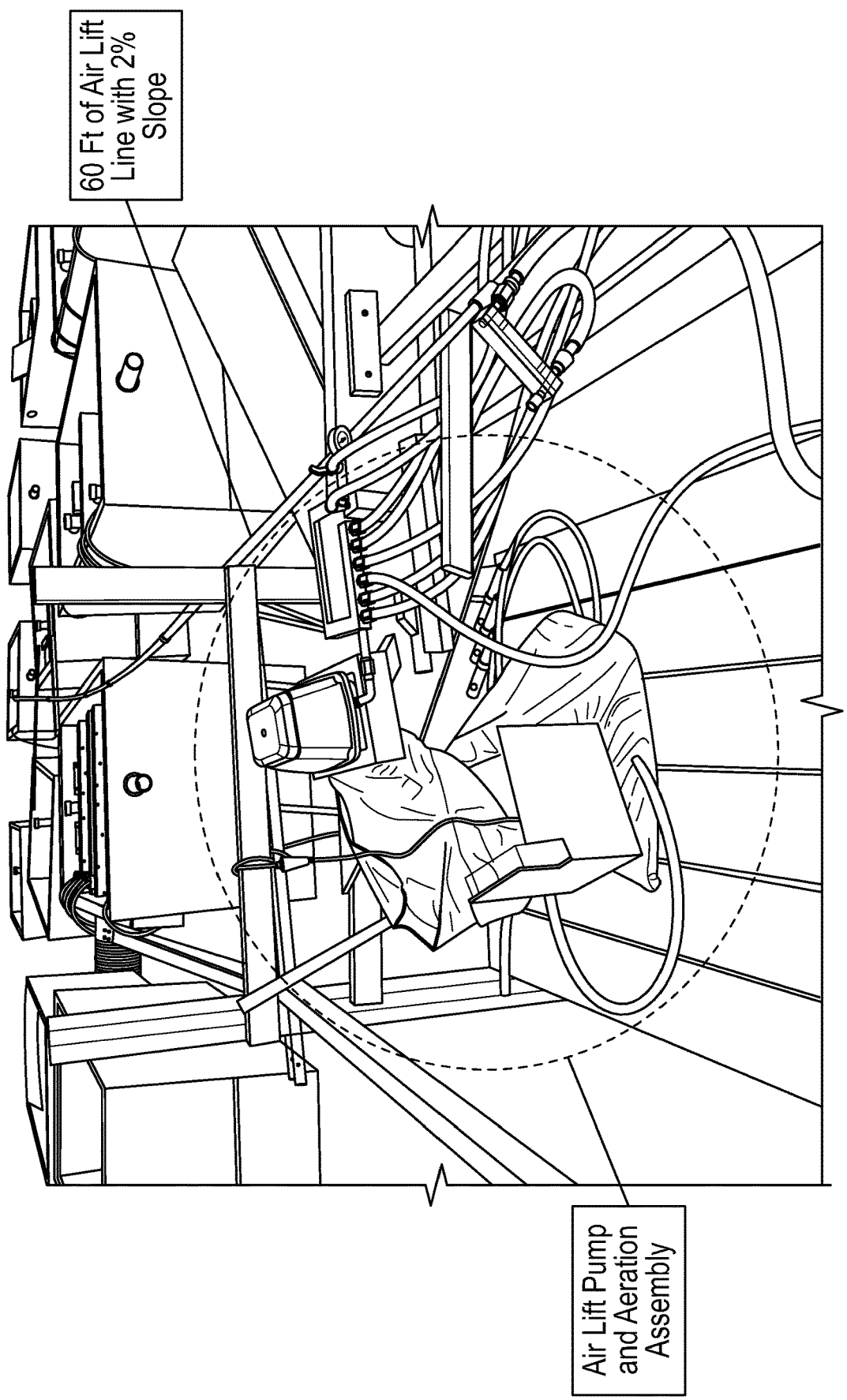

FIGS. 7-16 are figures and photos showing the air pump recycle line among the septic tank and different NitROE troughs and chambers. More specifically:

FIG. 7 is a side view schematic of the Air Lift pump Recycle Concept per one embodiment of this invention;

FIG. 8 is a side view photograph showing one embodiment of Air Lift pump Recycle Test Apparatus;

FIG. 9 is a front view photograph showing the right side of the Air Lift pump Recycle Test Apparatus from FIG. 8 with an Air Flow Control Meter and Valve;

FIG. 10 is a graph depicting projected Air Lift Pump Recycle Water Discharge and Air Flow Correlations;

FIG. 11 is a photograph showing an Air Lift pump Recycle Full-Scale Field Demonstration (with multiple Aeration Lines and one to two Air Recycle Lines);

FIG. 12 is a set of two photographs showing an Air Lift Pump Recycle Full-Scale Field Demonstration with Air Lift Pipe from different angles;

FIG. 13 is a top view photograph showing an Air Lift Pump Recycle Full-Scale Field Demonstration with Air Pump and System Aeration Air Header and multiple recycle lines;

FIG. 14 is a top view photograph showing the Air Lift Pump Recycle Full-Scale Field Demonstration using a Flow Control Meter and Valve;

FIG. 15 is a top view photograph showing the Air Lift Pump Recycle Full-Scale Field Demonstration with Flow Control Meter and Valve and Discharge Pipe with Recycle Water Flowing; and FIG. 16 is a side view photograph showing the Air Lift Pump Recycle Full-Scale Field Demonstration Achieving a Recycle Flow of 1-2 gallon per minute through 60 feet of pipe at a 2% slope.

Sulfur to Enhance Biological Denitrification

Figure 17:
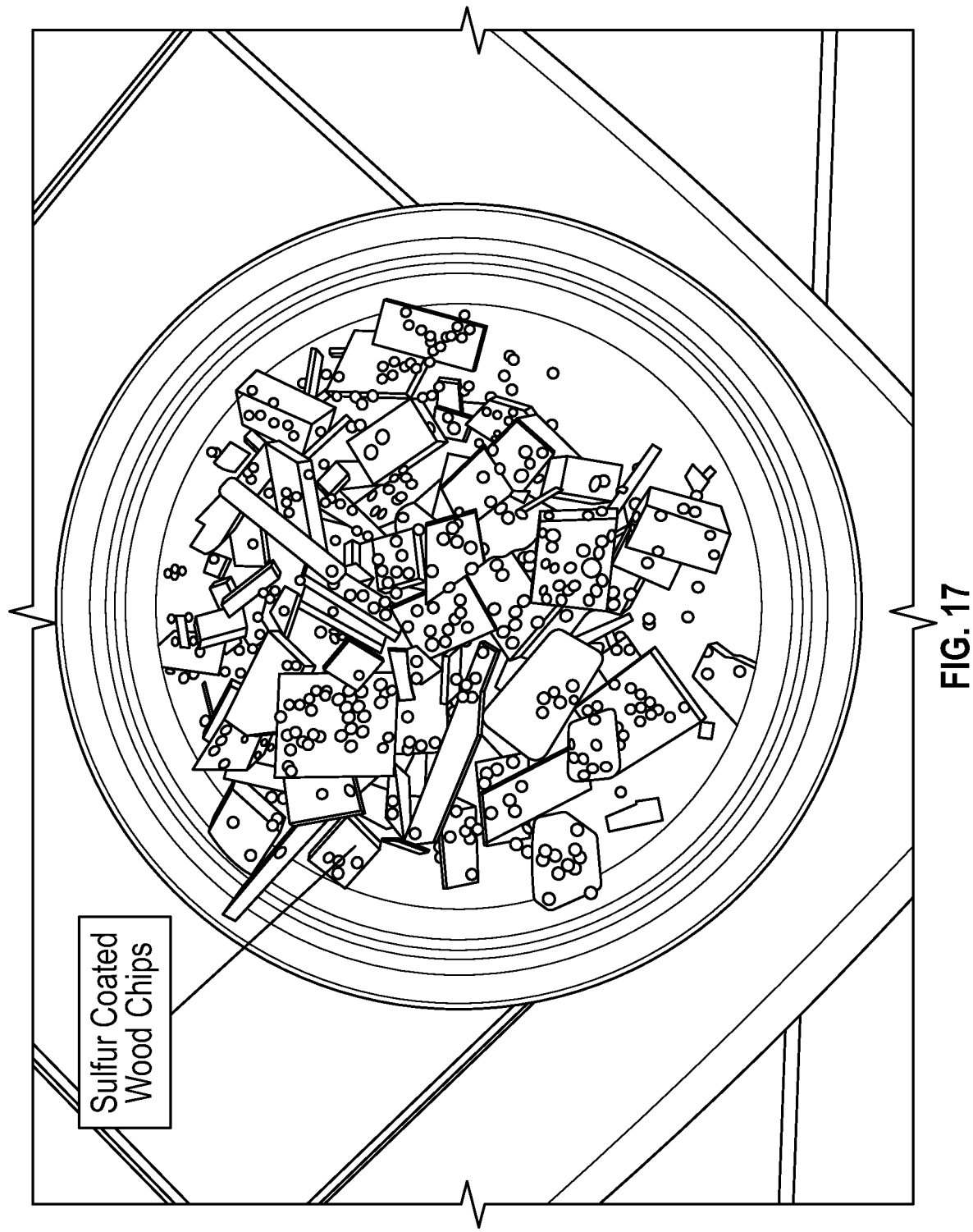
Figure 18:
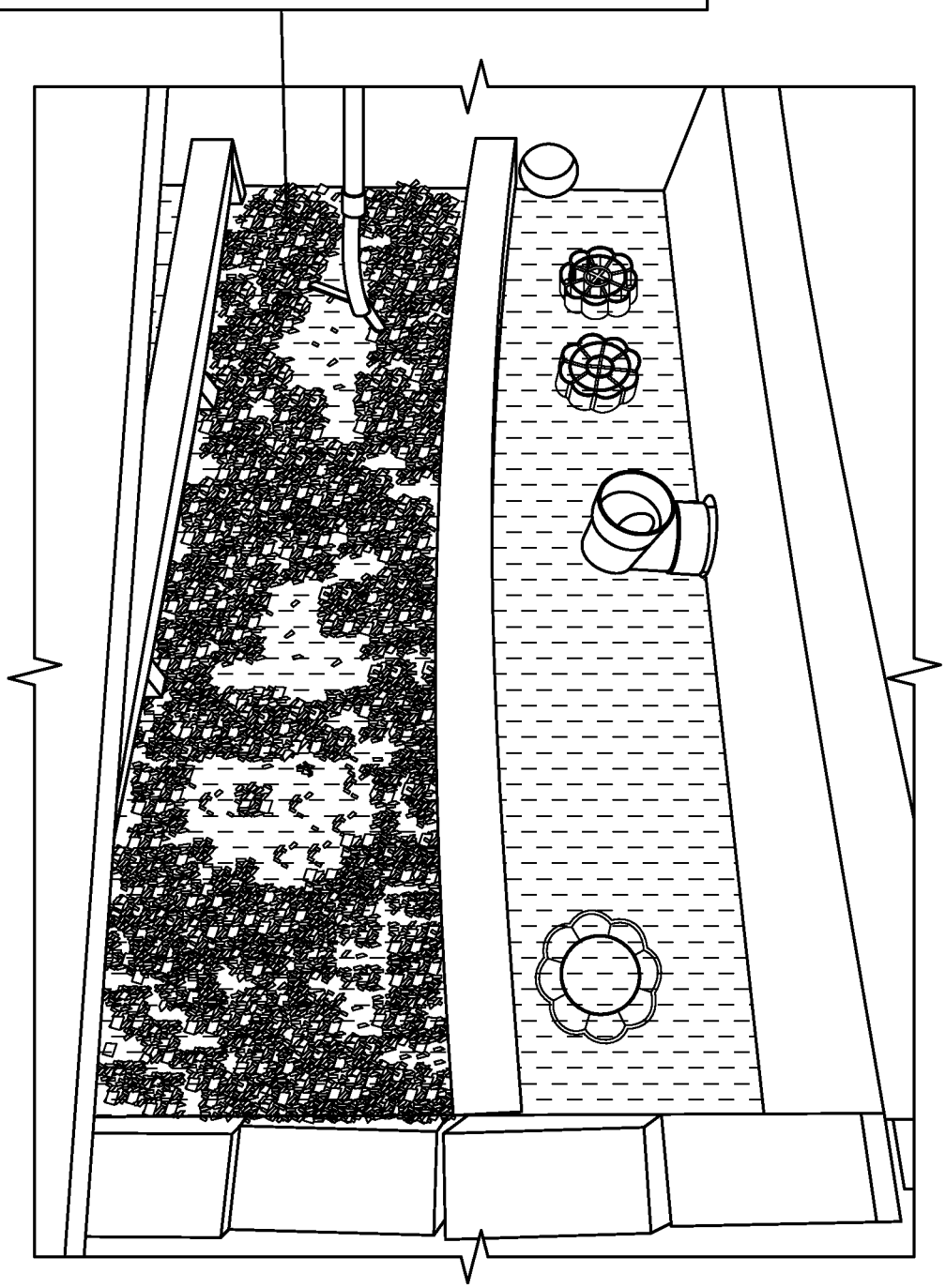
Figure 19:
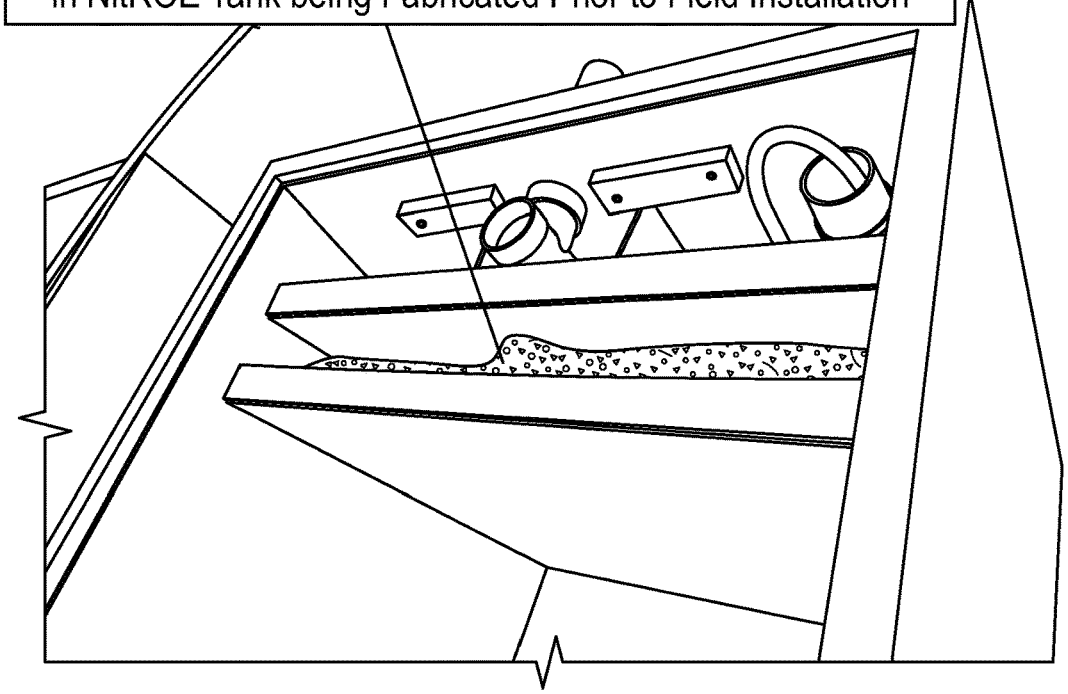
Figure 20:
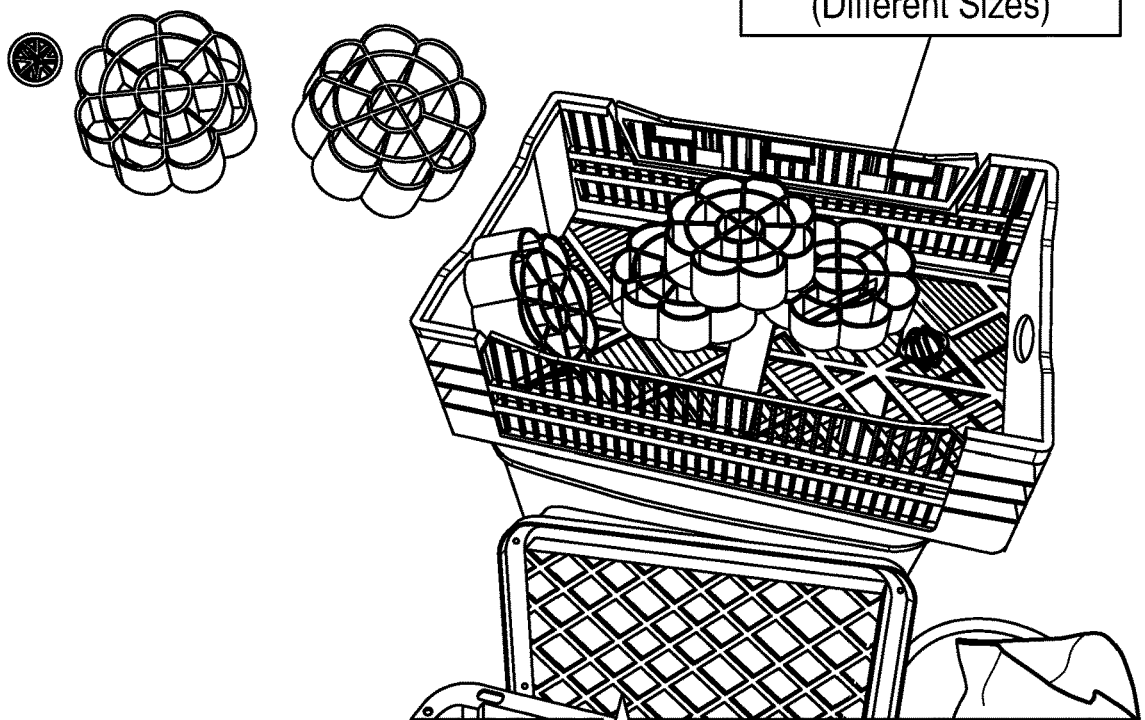
Figure 21:
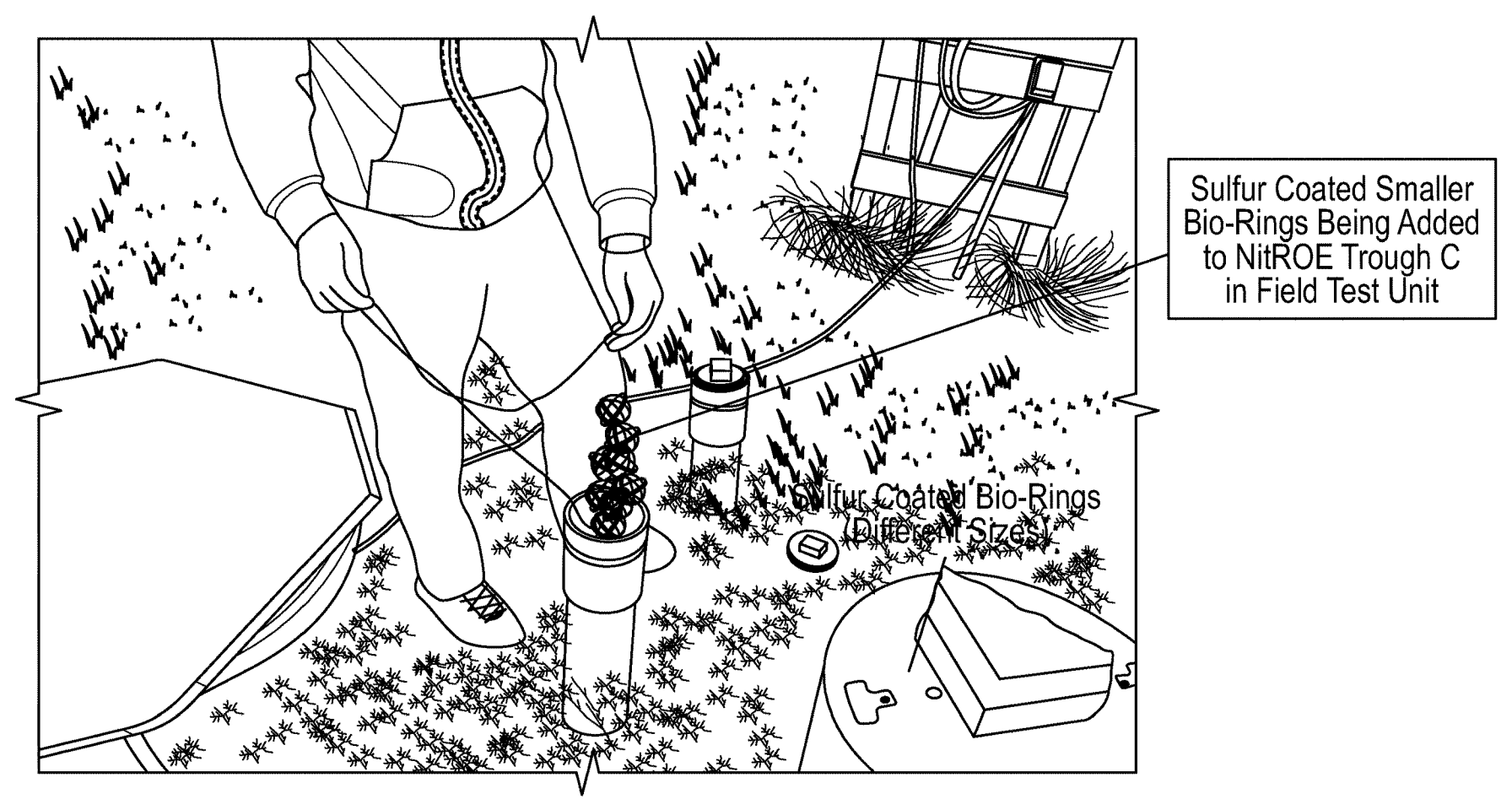
Figure 22:
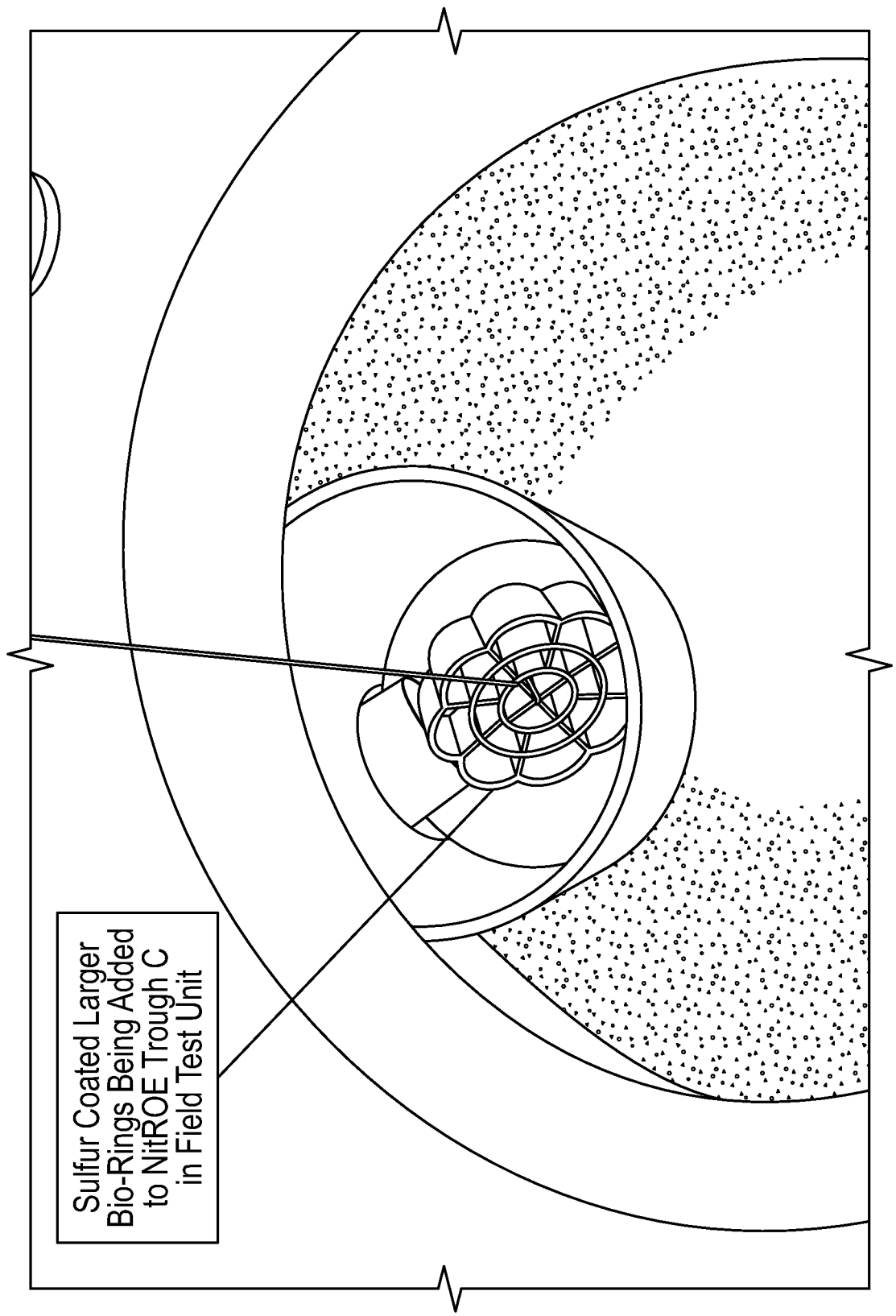
Figure 23:
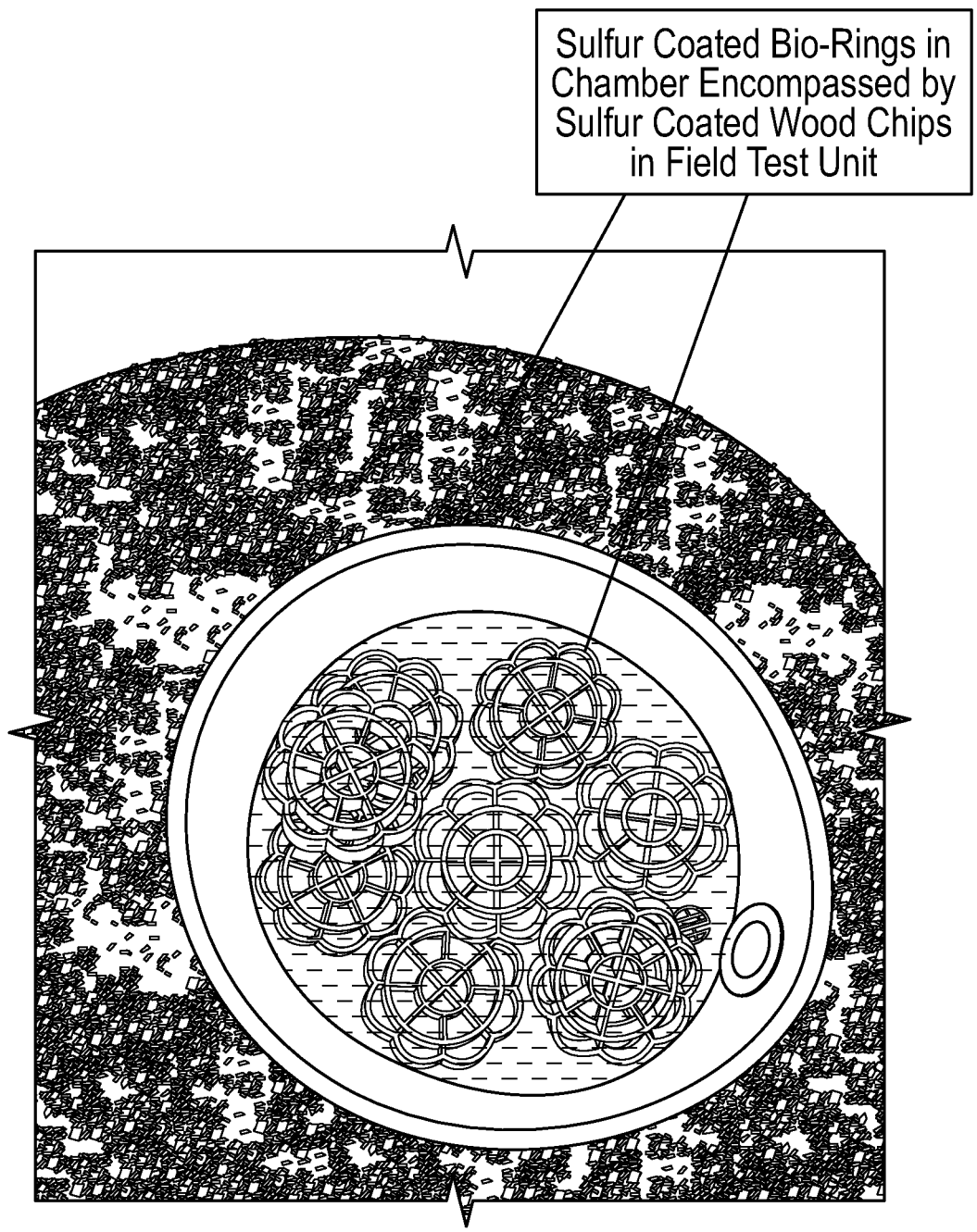

FIGS. 17-23 are photos of sulfur-wood chips and sulfur coated bio-rings that can be installed at the end of the NitROE tank flow. More specifically:

FIG. 17 is a top view photograph showing some Sulfur Coated Wood Chips;

FIG. 18 is a top view photograph showing some Sulfur Coated Wood Chips in Denitrification Chamber B Demonstration NitROE System;

FIG. 19 is a side view photograph showing some Sulfur Coated Wood Chips in Denitrification Chamber B In Fabrication;

FIG. 20 is two top view photographs showing some representative Sulfur Coated Plastic Bio-Rings (Small and Large Sizes);

FIG. 21 is a front view photograph showing some Small Size Sulfur Coated Plastic Bio-Rings Being Loaded into Access Pipe of Trough C via Surface Access Port;

FIG. 22 is a top, closeup view photograph showing some Larger Size Sulfur Coated Plastic Bio-Rings Being Loaded into Access Pipe of Trough C via Surface Access Port; and FIG. 23 is a top view photograph showing a combination of Sulfur-Wood Chips and Sulfur Coated Bio-Rings.

DETAILED DESCRIPTION OF THE INVENTION

The focus of these improvements for enhanced septic tank related domestic sanitary wastewater treatment is on enhancing biological denitrification—or the conversion of organic-N to ammonia-N to nitrite-N and nitrate-N, then ultimately to nitrogen gas for removal from the wastewater being treated by the septic tank system as a whole. Particularly, this invention: (i) adds different media to enhance the wood chip denitrification process. Furthermore, it: (ii) adds a recycle component for recycling treated wastewater back to the front end of the process using the same aeration pump and tubing that is being used for the aeration of the wastewater previously used to reduce soluble organics and the conversion of ammonia-N to nitrite-N and nitrate-N. It also facilitates the anammox process (in which ammonia plus having multiple ways to nitrite-N is converted to nitrogen gas). These processes can act singularly or in combination; thus having multiple ways to nitrogen from the wastewater being treated.

The present invention focuses on enhanced denitrification—that is the conversion of organic-N to ammonia-N to nitrite-N and nitrate-N and then ultimately to nitrogen gas. In applications on previous tank improvements, the focus was on both nitrification (conversion of ammonia-N to nitrite-N and nitrate-N), then the conversion of nitrite-N and nitrate-N to N gas via a conventional denitrification process with wood chips providing the supplemental organic carbon for the conversion of nitrite-N and nitrate-N to N gas under anoxic biological conditions.

While the tanks of those prior applications served to significantly reduce organic carbon and convert ammonia to nitrite and nitrate, the denitrification conversions observed were sometimes impacted by cold weather operation(s) and higher than expected concentrations of nitrite and nitrate formed. So, the focus of this case (below) is to add design components aimed at continuing to achieve near complete (preferably about 90% or greater) denitrification during: (i) colder weather operation (i.e., 35° F. and below) and/or (ii) higher than normal total nitrogen levels in the wastewater being treated.

1. The tank is operated in a completely flooded mode with gravity flow from Trough A through to Trough C—see FIGS. 1-6.

2. While the accompanying photos and figures show all troughs and chambers in ONE concrete tank, the different components can be in different tanks and/or impoundments depending on design wastewater flowrate yet still follow the same sequential gravity flow path.

3. Further note, these plurality of tanks and impoundments can be covered OR open to the surface and be below ground, above ground or some combination thereof.

4. Trough A contains bio support media and is aerated via an aeration tube and protective pipe arrangement for which one or more previous patent applications were filed. This trough can contain one or multiple aeration tubes depending on flow. The intent of this trough is to provide the necessary aeration capacity so that bio-degradable organic carbon is significantly reduced in Trough A prior to flowing into the submerged aeration chamber that follows. This trough can be operated with one or more aeration tubes on, or one or more aeration tubes off.

5. With the organic carbon associated with the sanitary domestic wastewater treated being significantly reduced in Trough A, the Submerged Aeration Chamber (SAC) that follows will predominately achieve the conversion of ammonia N to nitrite and nitrate N. Also, Trough A may achieve some level of the conversion of ammonia N to nitrite and nitrate N. The SAC also contains bio-growth media and limestone for helping to maintain the buffering alkalinity of the wastewater being treated in a neutral pH (6-8) range, thus serving to support this significant conversion of ammonia-N to nitrite and nitrate N.

6. The nitrification process does not significantly occur until the majority of wastewater organic carbon is removed, a step that will have been performed in Trough A. The NitROE design of this invention has wastewater flowing from the Trough A wall via one or more overflow devices (including holes and/or troughs) in the wall at or near the surface. That also serves to keep the organic C degrading bacteria predominantly in Trough A with the submerged aeration chamber containing predominately nitrifying and anammox bacteria.

7. Due to the separation, sequential, flooded or submerged, and plug flow reactor nature of wastewater flow from Trough A to the SAC and ultimately to Trough C, this process arrangement (along with the bio-growth and limestone media in the SAC) serves to promote the conversion of anammox bacteria that serves to reduce total N via the reaction of ammonia and nitrite N to N gas. This can only be accomplished with the majority of the organic carbon removed in Trough A, thus allowing for the anammox bacteria to proliferate in the SAC. It thus serves to remove total N in the 20-90% range —rather than the ammonia all being converted to nitrite and nitrate N as would occur in a complete mix type reactor. By not having to waste any bacterial solids, the SAC serves to ensure that robust nitrification and anammox bacterial populations are established and maintained.

8. To further enhance the nitrification and anammox denitrification processes in the SAC, an air lift pump is installed in Trough B. Details of this recycle air lift pump are illustrated in FIGS. 7-16. The following are noteworthy:

a. The concept of the air lift pump is best seen in accompanying FIGS. 7-10. Here, air is inserted into the bottom of a vertical pipe submerged below the flooded water level in Trough B. The air flow applied thereto serves to lift the water UP the pipe and discharge it from that pipe via the correlations plotted in FIG. 10. As cited, the larger the air flow, the larger the water recycle flow.

b. While air lift pumps may be generally known, what is unique and innovative is that the function of the airlift pump is controlled by the same air pump used to provide aeration to tubes and enclosures. This is accomplished by having air flow to the airlift pump controlled and measured by the control meter and valve cited in FIG. 9. Here, between 1-20% of the positive air flow produced by the respective air pump used to provide aeration and mixing to Troughs A, B and C, and the SAC, can also be used to supply the small amount of air flow needed for the air lift pump via the flow control meter and valve. This negates the need for installation of an electrical pump or a separate air pump for the air lift and recycle line.

9. The photos at FIGS. 11-16 demonstrate the air lift recycle process in a test unit. Here, the set-up depicted serves to achieve a recycle flow of <1-<2 gallons per minute through a 60 ft length of pipe at a 2% slope. While this recycle flow was achieved, that same air pump was used to provide equal aeration to 8 separate aeration lines as shown in different figures.

10. Wastewater recycling, via an air lift pump, can be from the following troughs to the respective system compartments:

i. From Trough B to Trough A.
ii. From Trough B to the septic tank, in the wastewater flow path ahead of the NitROE tank.
iii. From Trough C to Trough A.
iv. From Trough C to the septic tank, in the wastewater flow path ahead of the NitROE tank.

11. By doing these different recycle flows, a continuous and uniform flow through the NitROE system is ensured thus servings to ensure enhanced nitrification and anammox bacterial reactions in the SAC. It further serves to achieve a significant, i.e., 60-90% (or even greater than 90%), total N reduction prior to denitrification chamber treatment. By having the total N significantly reduced prior to the denitrification chamber, this invention serves to ensure significant denitrification in the wood chip volume, even in cold weather. This is because one is no longer depending on wood chip volume alone to denitrify all incoming nitrite and nitrate nitrogen that has been converted from ammonia in the SAC. Instead, it only removes a significantly less amount as total N is being converted to N gas and thus removed in the SAC that enhances both nitrifying and anammox bacterial populations. Important to note that during the recycling, the organic carbon, present in the untreated wastewater, serves to mix with the recycled nitrate-N and the organic carbon present the wastewater under anoxic conditions (without aeration) to convert nitrate-N to nitrogen gas in the SAC. Thus, this serves to reduce reliance on wood chips.

12. As an even further enhancement to ensure overall denitrification of formed nitrite and nitrate N, FIGS. 17-23 show how sulfur can be deployed in Denitrification Chamber B and Trough C.

a. With respect to Denitrification Chamber B, elemental sulfur can be mixed with the wood chips to enhance the denitrification process. Here, elemental sulfur in the presence of nitrate-N and select bacteria serve to convert the nitrate N to N gas and the sulfur to sulfate. While this process may be known to some extent, the innovation is that Denitrification Chamber B represents only 1-20 percent of the total volume denitrification wood chip volume. Thus, the bulk of wood chips in Denitrification Chamber A serve to denitrify and remove the bulk of the nitrate N, with the sulfur-wood chip combination serving to denitrify any residual nitrate not completely removed by just the wood chips alone in Denitrification Chamber A. If all the nitrate N is removed by wood chips alone, the sulfur in the wood chips will not be needed and not consumed. There is also a temperature-based variant in that when the outside and thus wastewater temperatures are relatively low, i.e., at about 35° F. or lower, or during a high flow event, all the chips ensure nitrite-nitrate discharge levels below 1 ppm. This enhancement also helps when the wastewater temperature is 60° F. and lower although the S enhancements have a bigger effect as you go to lower temps about 35° F. or lower.

b. This is significant since during warmer operations, the wood chips serve to denitrify at an enhanced rate. But that rate significantly decreases during colder wastewater temperature operations or higher flow rates. The rate with a sulfur-wood chip combination is not as significantly impacted during cold wastewater temperature operation (i.e., around 35° F. or less). Hence, it will thus continue to denitrify residual nitrate N not removed by the wood chips alone . . . to levels less than about 1 ppm.

c. FIGS. 20-22 shows how sulfur coated bio-rings can be added to Trough C. They would serve to denitrify nitrate to nitrogen gas via the same sulfur-wood chip biological process—but in an open trough and only using sulfur on the coated bio-rings. Here again, the bio-ring coated sulfur will only be consumed if residual nitrate reaches Trough C.

13. In summary, TWO layers of denitrification enhancement are provided to the original concept of aerated nitrification and wood chip denitrification alone. Particularly, separation AND the order of sequencing matter—they are critical to the success of this invention. Order matters as does plug flow and flooded submerged media reactor design.

In addition:

a. Recycle via an innovative air lift pump arrangement to enhance and sustain robust populations of both nitrifying bacteria and anammox bacteria in the Submerged Aeration Chamber (SAC). That serves to achieve significant total N reductions in the 20-90, more preferably 60-90% range.

b. With recycling achieving significant total N reduction, even before the wood chip Denitrification Chamber A, this should sufficiently ensure that the wood chips alone would serve to reduce nitrate N to low mg/l levels. Nevertheless, Denitrification Chamber B will serve as an added measure to assure reducing to low mg/l levels any nitrate N not totally removed in the wood chip alone of Denitrification Chamber A, especially during cold weather operation.

Also noteworthy, should very low mg/l nitrate N levels enter Denitrification chamber B, the sulfur-nitrate N reaction will not occur and the S will not be consumed.

This final biologically mediated sulfur reaction with nitrate-N can occur in Denitrification Chamber B. But it can also be accomplished by adding sulfur-coated media to open Trough C.

Note. For some of the foregoing components, if they are not needed, they will NOT be used and thus are on a standby, almost automatic mode for use WHEN needed.

Winter Fix

In the summer months, the wood chips in the system typically release enough organics. But in cold weather, as may be experienced between November and May, these same wood chips may not release enough of the same. So preferably, at least one time per cold season, denitrification may be boosted, or 'juiced up', by adding as a permeable reactor barrier an emulsion/emulsifying Winter Mix. It should be added within an influent chamber of the nitro tank . . . ahead of the wood chips in the system.

The system may be intermittently/periodically monitored. If the nitrites register at too high of a level, the so-called booster shot may be added. Once the emulsifier is added, it almost immediately absorbs onto the wood chips thus enabling the system to continue denitrification.

The addition of emulsifier can be added in other than the winter months. It can still help with denitrification. The operators cannot accidentally overdose the system; once added, the additive can be "kept" until needed.

One preferred version of emulsifier/additive comprises a vegetable oil to which a percentage of water is added for viscosity reasons. Representative oils include one or more of: sunflower oil, canola, peanut oil or another vegetable derivative. When desired, a grease component may be added for prolonging usable emulsion lifetime.

Having described the best modes currently known for practicing this system and method, it is to be understood that the scope of this invention may be further described by the attached claims.

SEQUENCE LISTING

Not applicable.

What is claimed is:

1. A process of wastewater treatment, the process comprising:
flowing wastewater through a plurality of water troughs for treating the wastewater,
wherein flowing comprises water moving from a first water trough to a second water trough for treatment, the second water trough after the first water trough, the first water trough receiving wastewater for treatment, the first water trough comprising biogrowth media, and
flowing wastewater out of the second trough and to a discharge channel of the plurality of water troughs, the discharge channel having a wastewater inlet intake for receiving wastewater that has flowed from the first water trough and the second water trough, the wastewater inlet intake is configured to be stationary,
wherein the first water trough comprises a first wall having a plurality of passages positioned along a width of the first wall and positioned along a height of the first wall, the plurality of passages permitting water present in the first water trough to enter the first water trough via the plurality of passages in the first wall,
wherein the first water trough comprises a second wall having a plurality of passages positioned along a width of the second wall and positioned along a height of the second wall, the plurality of passages permitting water present in the first water trough to exit the first water trough via the plurality of passages in the second wall.

2. The process of claim 1 further comprising:
operating an aeration pump, the aeration pump configured and positioned to aerate wastewater in one or more of the water troughs.

3. The process of claim 1 wherein the biogrowth media is woodchips and wherein the first water trough further comprises limestone media.

4. The process of claim 1 wherein flowing comprises organic wastewater overflowing from the first water trough to the second water trough.

5. A process of wastewater treatment, the process comprising:
flowing wastewater through a plurality of water troughs for treating the wastewater,
wherein flowing comprises water moving from a first water trough to a second water trough for treatment, the second water trough after the first water trough, the first water trough receiving wastewater for treatment, the first water trough comprising biogrowth media, and
flowing wastewater out of the second trough and to a discharge channel of the plurality of water troughs, the discharge channel having a wastewater inlet intake for receiving wastewater that has flowed from the first water trough and the second water trough, the wastewater inlet intake is configured to be stationary,
wherein the first water trough comprises a wall having a plurality of passages positioned along a width of the wall and positioned along a height of the wall, the plurality of passages permitting water present in the first water trough to exit the first water trough via the plurality of passages in the wall, and
wherein flowing further comprises organic wastewater gravity flowing from the first water trough to the second water trough and to the wastewater inlet intake.

6. A process of wastewater treatment, the process comprising:
flowing wastewater through a plurality of water troughs for treating the wastewater,
wherein flowing comprises water moving from a first water trough to a second water trough for treatment, the second water trough after the first water trough, the first water trough receiving wastewater for treatment, the first water trough comprising biogrowth media, and
flowing wastewater out of the second trough and to a discharge channel of the plurality of water troughs, the discharge channel having a wastewater inlet intake for receiving wastewater that has flowed from the first water trough and the second water trough, the wastewater inlet intake is configured to be stationary,
wherein the first water trough comprises a wall having a plurality of passages positioned along a width of the wall and positioned along a height of the wall, the plurality of passages permitting water present in the first water trough to exit the first water trough via the plurality of passages in the wall, and wherein each of the first and second troughs comprise a first media, the first media selected from the group consisting of: elemental sulfur, sulfur-coated wood chips, sulfur-coated bio rings and combinations thereof.

7. A process of wastewater treatment, the process comprising:

flowing wastewater through a plurality of water troughs for treating the wastewater, wherein flowing comprises water moving from a first water trough to a second water trough for treatment, the second water trough after the first water trough, the first water trough receiving wastewater for treatment, the first water trough comprising biogrowth media, and flowing wastewater out of the second trough and to a discharge channel of the plurality of water troughs, the discharge channel having a wastewater inlet intake for receiving wastewater that has flowed from the first water trough and the second water trough, the wastewater inlet intake is configured to be stationary, wherein the first water trough comprises a wall having a plurality of passages positioned along a width of the wall and positioned along a height of the wall, the plurality of passages permitting water present in the first water trough to exit the first water trough via the plurality of passages in the wall, and further comprising operating a wastewater recycling system, the wastewater recycling system configured and positioned to recycle wastewater treated by one or more water troughs to above a wastewater surface of another water trough.

8. The process of claim 7 wherein operating the wastewater recycling system comprises using an air pump also used for aeration and operating this air pump at less than 20% of total air flow when employing the pump for recycling wastewater.

9. A process of wastewater treatment, the process comprising:

flowing wastewater through a plurality of water troughs for treating the wastewater, wherein flowing comprises water moving from a first water trough to a second water trough for treatment, the second water trough after the first water trough, the first water trough receiving wastewater for treatment, the first water trough comprising biogrowth media, and flowing wastewater out of the second trough and to a discharge channel of the plurality of water troughs, the discharge channel having a wastewater inlet intake for receiving wastewater that has flowed from the first water trough and the second water trough, the wastewater inlet intake is configured to be stationary, wherein the first water trough comprises a wall having a plurality of passages positioned along a width of the wall and positioned along a height of the wall, the plurality of passages permitting water present in the first water trough to exit the first water trough via the plurality of passages in the wall, and wherein the second trough further comprises submerged aeration piping, the piping having aeration orifices and oriented across a bottom portion of the second trough; wherein the second trough also comprises a first media, the first media comprising sulfur-coated bio rings.

10. A process of wastewater treatment, the process comprising:

flowing wastewater through a plurality of water troughs for treating the wastewater, wherein flowing comprises water moving from a first water trough to a second water trough for treatment, the second water trough after the first water trough, the first water trough receiving wastewater for treatment, the first water trough comprising biogrowth media, and flowing wastewater out of the second trough and to a discharge channel of the plurality of water troughs, the discharge channel having a wastewater inlet intake for receiving wastewater that has flowed from the first water trough and the second water trough, the wastewater inlet intake is configured to be stationary, wherein the first water trough comprises a wall having a plurality of passages positioned along a width of the wall and positioned along a height of the wall, the plurality of passages permitting water present in the first water trough to exit the first water trough via the plurality of passages in the wall, and wherein the biogrowth media of the first trough is completely submerged and selected from the group consisting of: elemental sulfur, sulfur-coated wood chips, sulfur-coated bio rings and combinations thereof.

11. A process of wastewater treatment, the process comprising:

flowing wastewater through a plurality of water troughs for treating the wastewater, wherein flowing comprises water moving from a first water trough to a second water trough for treatment, the second water trough after the first water trough, the first water trough receiving wastewater for treatment, the first water trough comprising biogrowth media, and flowing wastewater out of the second trough and to a discharge channel of the plurality of water troughs, the discharge channel having a wastewater inlet intake for receiving wastewater that has flowed from the first water trough and the second water trough, the wastewater inlet intake is configured to be stationary, wherein the first water trough comprises a wall having a plurality of passages positioned along a width of the wall and positioned along a height of the wall, the plurality of passages permitting water present in the first water trough to exit the first water trough via the plurality of passages in the wall, and wherein each water trough is present in a same shared concrete structure and each water trough shares an ongoing operational wastewater surface level corresponding to the location of a portion of the discharge channel that penetrates through the shared concrete structure, the discharge channel comprising PVC piping.

12. A process of wastewater treatment, the process comprising:

flowing wastewater through a plurality of water troughs for treating the wastewater, wherein flowing comprises water moving from a first water trough to a second water trough for treatment, the second water trough after the first water trough, the first water trough receiving wastewater for treatment, the first water trough comprising biogrowth media, and flowing wastewater out of the second trough and to a discharge channel of the plurality of water troughs, the discharge channel having a wastewater inlet intake for receiving wastewater that has flowed from the first water trough and the second water trough, the wastewater inlet intake is configured to be stationary, wherein the first water trough comprises a wall having a plurality of passages positioned along a width of the wall and positioned along a height of the wall, the plurality of passages permitting water present in the first water trough to exit the first water trough via the plurality of passages in the wall, and further comprising gravity flowing wastewater out of from the second trough to a third water trough, the third trough receiving overflowing wastewater from the second trough, the third trough comprising elemental sulfur, the elemental sulfur being submerged in wastewater present in the third trough.

13. A process of wastewater treatment comprising:
providing a plurality of sequentially arranged water troughs, the first of the water troughs having a submerged aeration chamber (SAC) in which organic wastewater is degraded;
providing an intermediate water trough of the plurality of sequentially arranged water troughs, the intermediate water trough comprising wood chips, the wood chips providing denitrification of organic wastewater present in the intermediate water trough; and
providing a third water trough,
wherein the intermediate water trough comprises an inlet wall with a height and a width and an outlet wall with a height and a width, each of the inlet wall and the outlet wall comprising a plurality of passages located up and down the height of each wall and located along the width of each wall, the passages of the plurality sized and positioned to allow water to flow into the intermediate trough and out of the intermediate trough,
wherein at least an operating wastewater surface level of the third water trough corresponds to a position of a discharge channel, the discharge channel configured to receive wastewater from the third water trough, the discharge channel having a stationary intake inlet.

14. The process of claim 13 further comprising a component operating to recycle treated wastewater back to a front end of the plurality of sequentially arranged water troughs, wherein wastewater organic carbon and Nitrate-N, under anoxic conditions, will go on to form nitrogen gas and CO2 when passing through the plurality of sequentially arranged troughs.

15. The process of claim 13 wherein the third water trough comprises submerged elemental sulfur, the submerged elemental sulfur operating to provide further denitrification of waster received from the intermediate water trough, and wherein the elemental sulfur is present on a ring.

16. The process of claim 13 wherein wastewater gravity flows as overflow from the first water trough to the intermediate water trough.

17. The process of claim 13 wherein each of the water troughs comprise wood chips.

18. The process of claim 13 wherein the submerged aeration chamber is configured and positioned to perform an anammox process in the first trough.

19. The process of claim 13 wherein one or more of the water troughs of the plurality comprises an emulsifier that includes one or more vegetable oils.

20. A process of wastewater treatment comprising:
flowing wastewater into a series of sequential troughs;
in a first trough, treating wastewater by converting ammonia in the wastewater to both nitrite-N and nitrate-N under aerobic conditions; and
then, in a second trough, treating wastewater by converting nitrite-N and nitrate-N to nitrogen gas under anoxic conditions, wherein at least a wall of the second trough has a plurality of passages through the wall allowing water to pass into or out of the second trough, the wall having a bottom, a top, and a width, wherein passages from the plurality of passages are located at various heights between the top and bottom of the wall, and wherein passages from the plurality of passages are located at various positions along the width of the wall, and
wherein in a last water trough of the sequential troughs, an operating wastewater surface level of the last water trough corresponds to a position of stationary discharge channel, the discharge channel configured to receive wastewater from the last water trough, the operating wastewater surface level corresponding to the position of the stationary discharge channel during operation, the stationary discharge channel comprising a stationary intake inlet.

21. The process of claim 20 further comprising recycling wastewater treated in the second trough back towards the first trough using air pressure from a submerged air chamber in the first trough and wherein passages of the plurality of passages are uniformly spaced apart from each other along the width of the wall.

22. The process of claim 20 further comprising recycling wastewater, previously treated in the second trough, back towards an upstream tank, wherein the stationary discharge channel comprises PVC piping and the stationary intake inlet, and wherein the last water trough is the second trough, and wherein passages of the plurality of passages are all uniformly spaced apart from each other between the top and the bottom of the wall.

* * * * *